(12) United States Patent
Kayner et al.

(10) Patent No.: US 7,114,857 B1
(45) Date of Patent: Oct. 3, 2006

(54) TRANSCEIVER MODULE

(75) Inventors: Andrew Kayner, Boulder, CO (US);
Andrew Moore, Riverton, UT (US);
Susan Tower, Nederland, CO (US);
Gerald Renoux, Lyons, CO (US);
Bryan Yunker, Longmont, CO (US)

(73) Assignee: Picolight, Inc., Boulder, CO (US)

( * ) Notice: Subject to any disclaimer, the term of this patent is extended or adjusted under 35 U.S.C. 154(b) by 93 days.

(21) Appl. No.: 10/781,916

(22) Filed: Feb. 20, 2004

(51) Int. Cl.
*G02B 6/36* (2006.01)
*G02B 6/40* (2006.01)
(52) U.S. Cl. .................. 385/88; 385/53; 385/92
(58) Field of Classification Search ............ 385/88
See application file for complete search history.

(56) References Cited

U.S. PATENT DOCUMENTS

| | | | |
|---|---|---|---|
| 4,083,619 A | 4/1978 | McCormick et al. | |
| 4,387,956 A | 6/1983 | Cline | |
| 4,734,049 A | 3/1988 | George et al. | |
| 5,195,897 A | 3/1993 | Kent et al. | |
| 5,256,080 A | 10/1993 | Bright | |
| 5,329,428 A | 7/1994 | Block et al. | |
| 5,734,558 A | 3/1998 | Poplawski et al. | |
| 5,738,538 A | 4/1998 | Bruch et al. | |
| 5,820,398 A | 10/1998 | Stabroth et al. | |
| 5,879,173 A | 3/1999 | Poplawski et al. | |
| 5,901,263 A | 5/1999 | Gaio et al. | |
| 5,931,290 A | 8/1999 | Wehrli, III et al. | |
| 5,980,324 A | 11/1999 | Berg et al. | |
| 6,074,228 A | 6/2000 | Berg et al. | |
| 6,142,802 A | 11/2000 | Berg et al. | |
| 6,142,828 A | 11/2000 | Pepe | |
| 6,149,465 A | 11/2000 | Berg et al. | |
| 6,229,708 B1 * | 5/2001 | Corbin et al. | 361/728 |
| 6,231,145 B1 | 5/2001 | Liu | |
| 6,430,053 B1 | 8/2002 | Peterson et al. | |
| 6,439,918 B1 * | 8/2002 | Togami et al. | 439/372 |
| 6,872,010 B1 * | 3/2005 | Bianchini | 385/92 |

* cited by examiner

*Primary Examiner*—Frank G. Font
*Assistant Examiner*—Eric Wong
(74) *Attorney, Agent, or Firm*—Jagtiani & Guttag

(57) ABSTRACT

The present invention provides transceiver modules in which a transceiver may be ejected from a cage into which the transceiver is inserted by pivoting a handle mounted on the transceiver.

6 Claims, 22 Drawing Sheets

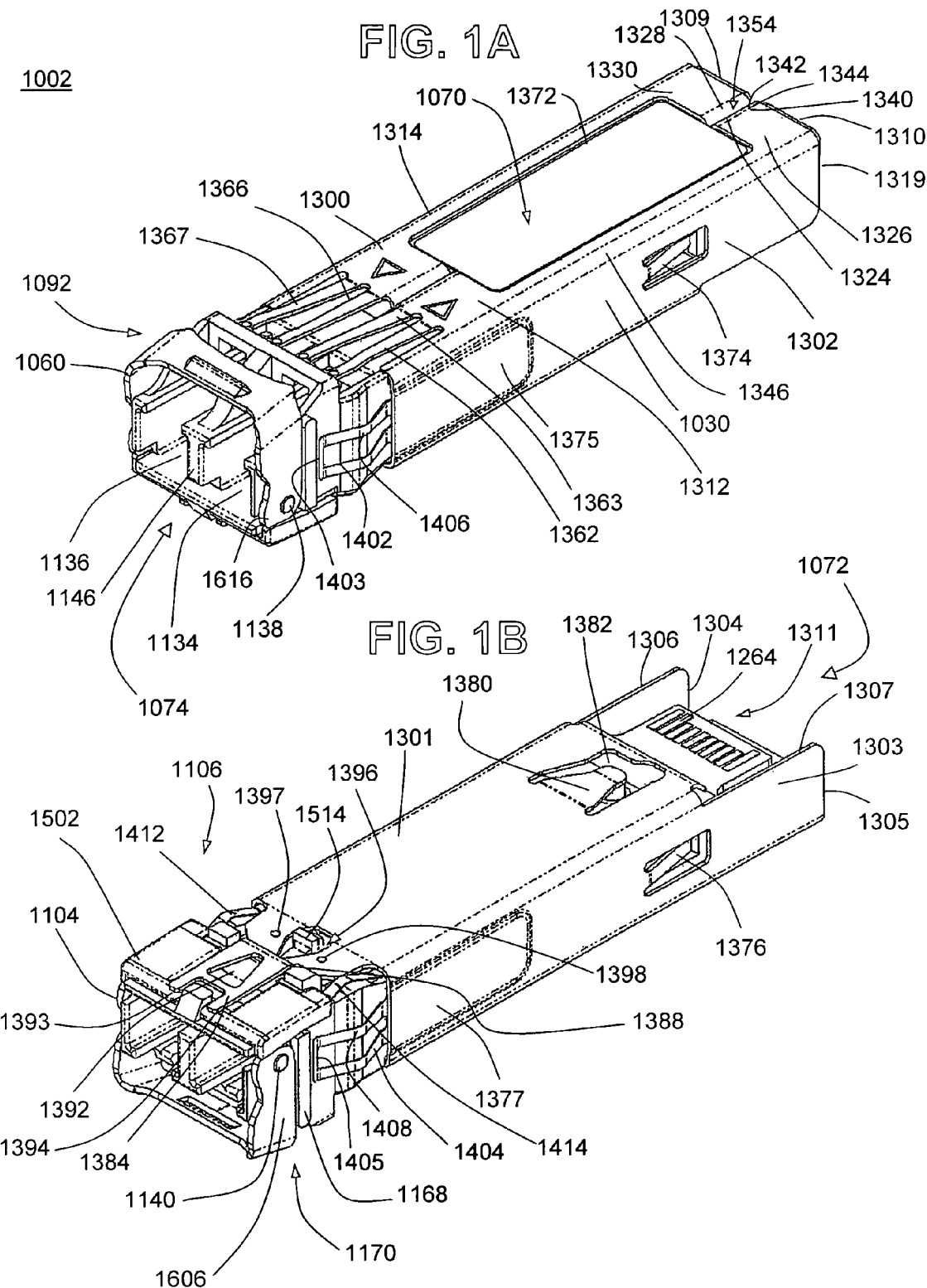

4070

4028  4204  4026

TRANSCEIVER MODULE

BACKGROUND OF THE INVENTION

1. Field of the Invention

The present invention relates to transceiver modules for use with transceiver cages.

2. Description of the Prior Art

Optoelectronic transceivers are utilized to interconnect circuit cards of communication links and other electronic modules or assemblies. Various international and industry standards define the type of connectors used to interface computers to external communication devices such as modems, network interfaces, and other transceivers. A well-known type of transceiver module developed by an industry consortium and known as a Gigabit Interface Converter (GBIC) provides an interface between a computer and an Ethernet, Fiber Channel, or other data communication environment. U.S. patents identified under issued U.S. Pat. Nos. 5,879,173, 5,864,468, 5,734,558, 5,717,533, and U.S. Pat. No. Re 36,820, originally assigned to Methode Electronics, Inc, and now assigned to Stratos Lightwave, both in Chicago, Ill., disclose pluggable transceiver modules. U.S. Pat. Nos. 5,879,173, 5,864,468, 5,734,558, 5,717,533, and U.S. Pat. No. Re 36,820 are hereby incorporated by reference.

It is desirable to miniaturize transceivers in order to increase the port density associated with the network connection (switch boxes, cabling patch panels, wiring closets, computer I/O, etc.). Various standards are known that define form factors for miniaturized electronic devices, such as the Small Form-Factor Pluggable (SFP) standard that specifies an enclosure 9.8 millimeters in height by 13.5 millimeters in width and having a minimum of 20 electrical input/output connections. The specific standards for SFP transceivers are set forth in the "Small Form-Factor Pluggable (SFP) Transceiver Multisource Agreement (MSA)," dated Sep. 14, 2000, which are hereby incorporated by reference.

In order to maximize the available number of transceivers per area, multiple SFP transceivers modules are generally arranged in rows and columns. Each SFP transceiver module is plugged into a socket or receptacle. These sockets or receptacles are generally stacked to maximize the number of available transceiver modules per allotted area. In Such stacked configurations, a release mechanism is necessary to remove a transceiver module from within a receptacle. The release member generally is located on the bottom and embedded behind the face of the transceiver module. A special tool or probe must be inserted into a small slit on an external face of the transceiver module in order to access and depress the release mechanism. The requirement of a tool for removing the transceiver module is not only inconvenient, but also prevents an operator from removing a transceiver module if he or she does not have a tool at the appropriate time. The requirement of a tool results in increased installation cost and/or repair time.

One attempt to provide a pluggable transceiver module having a release mechanism is described in U.S. Pat. No. 6,430,053 to Peterson et al. However, the mechanism described in this patent employs a delatch mechanism that is relatively difficult to manufacture and is relatively fragile in construction.

Accordingly, there is still a need for a better pluggable transceiver module having a release mechanism that is easily accessible to an operator and does not require any tools to operate.

SUMMARY OF THE INVENTION

In view of the foregoing, it is an object of the present invention to provide a release mechanism for a transceiver module that does not require a tool to operate.

Another object of the present invention is to provide an easily operable release mechanism at minimal cost.

Another object of the present invention is to provide a lever that functions as both a release and a removal mechanism.

Another object of the present invention is to provide a release and removal mechanism that can be operated by a thumb and index finger.

Yet a further object of the present invention is to provide a release and removal mechanism that can be easily assembled.

Yet a further object of the present invention is to provide a release and removal mechanism for a transceiver module that does not increase the overall height and width of the transceiver module.

Yet a further object of the present invention is to provide a delatch mechanism that is easy to manufacture.

Yet a further object of the present invention is to provide a delatch mechanism that is relatively robust in construction.

According to a first broad aspect of the present invention, there is provided a transceiver module comprising: a transceiver body including a rocker return spring at a proximal end thereof; a handle pivotably connected to said proximal end of said transceiver body at first and second arms of said handle, said handle including first and second cams on said first and second arms, respectively, and said handle having an unlatched and a latched position; and a rocker pivotably mounted on said transceiver body, said rocker including a distal end having a tab for extending through an opening in said transceiver body and for extending through an opening in a transceiver cage to thereby hold said transceiver body in said transceiver cage when said handle is in a latched position, said rocker including a proximal free end that is biased against said first and second arms of said handle, wherein when said handle is an unlatched position, said first and second cams lift said proximal end of said rocker to cause said tab to retract from said transceiver cage opening thereby allowing said transceiver body to be removed from said transceiver cage in a proximal direction.

According to a second broad aspect of the invention, there is provided a transceiver assembly comprising: a transceiver cage; a transceiver body for inserted in said transceiver cage, said transceiver body including a rocker return spring at a proximal end thereof; a handle pivotably connected to said proximal end of said transceiver body at first and second arms of said handle, said handle including first and second cams on said first and second arms, respectively, and said handle having an unlatched and a latched position; and a rocker pivotably mounted on said transceiver body, said rocker including a distal end having a tab for extending through an opening in said transceiver body and for extending through an opening in said transceiver cage to thereby hold said transceiver body in said transceiver cage when said handle is in a latched position, said rocker including a proximal free end that is biased against said arm of handle, wherein when said handle is an unlatched position, said first and second cams lift said proximal end of said rocker to cause said tab to retract from said transceiver cage opening thereby allowing said transceiver body to be removed from said transceiver cage in a proximal direction.

According to a third broad aspect of the invention, there is provided a transceiver module comprising: a transceiver body; a handle pivotably connected to a proximal end said transceiver body, said handle including a cam and having an unlatched and latched position; a tab on said transceiver body for extending through an opening in a cage flange spring of a transceiver cage to thereby hold said transceiver body in said transceiver cage when said handle is in a latched position; and a rocker return spring mounted on said transceiver body and being covered by said cage flange spring when said transceiver is held in said transceiver, said rocker return spring including an opening through which said tab extends when said handle is in a latched position, wherein when said handle is in a unlatched position, said cam is pivoted to cause a free end of said rocker return spring to be lifted and thereby cause a free end of said cage flange spring to be lifted, said tab to be unrestrained in a proximal direction by said rocker return spring opening and said cage flange spring opening, and said transceiver body to be removed from said cage.

According to a fourth broad aspect of the invention, there is provided a transceiver assembly comprising: a transceiver cage; a transceiver body for insert in said transceiver cage; a handle pivotably connected to a proximal end said transceiver body, said handle including a cam and having an unlatched and latched position; a tab on said transceiver body for extending through an opening in a cage flange spring of said transceiver cage to thereby hold said transceiver body in said transceiver cage when said handle is in a latched position; and a rocker return spring mounted on said transceiver body and being covered by said cage flange spring when said transceiver is held in said transceiver, said rocker return spring including an opening through which said tab extends when said handle is in a latched position, wherein when said handle is in a unlatched position, said cam is pivoted to cause a free end of said rocker return spring to be lifted and thereby cause a free end of said cage flange spring to be lifted, said tab to be unrestrained in a proximal direction by said rocker return spring opening and said cage flange spring opening, and said transceiver body to be removed from said cage.

Other objects and features of the present invention will be apparent from the following detailed description of the preferred embodiment.

BRIEF DESCRIPTION OF THE DRAWINGS

The invention will be described in conjunction with the accompanying drawings, in which:

FIG. 1A is a top perspective view of a transceiver module constructed in accordance with a preferred embodiment of the invention;

FIG. 1B is a bottom perspective view of the transceiver of FIG. 1A;

DETAILED DESCRIPTION OF THE PREFERRED EMBODIMENT

Figure 1C:
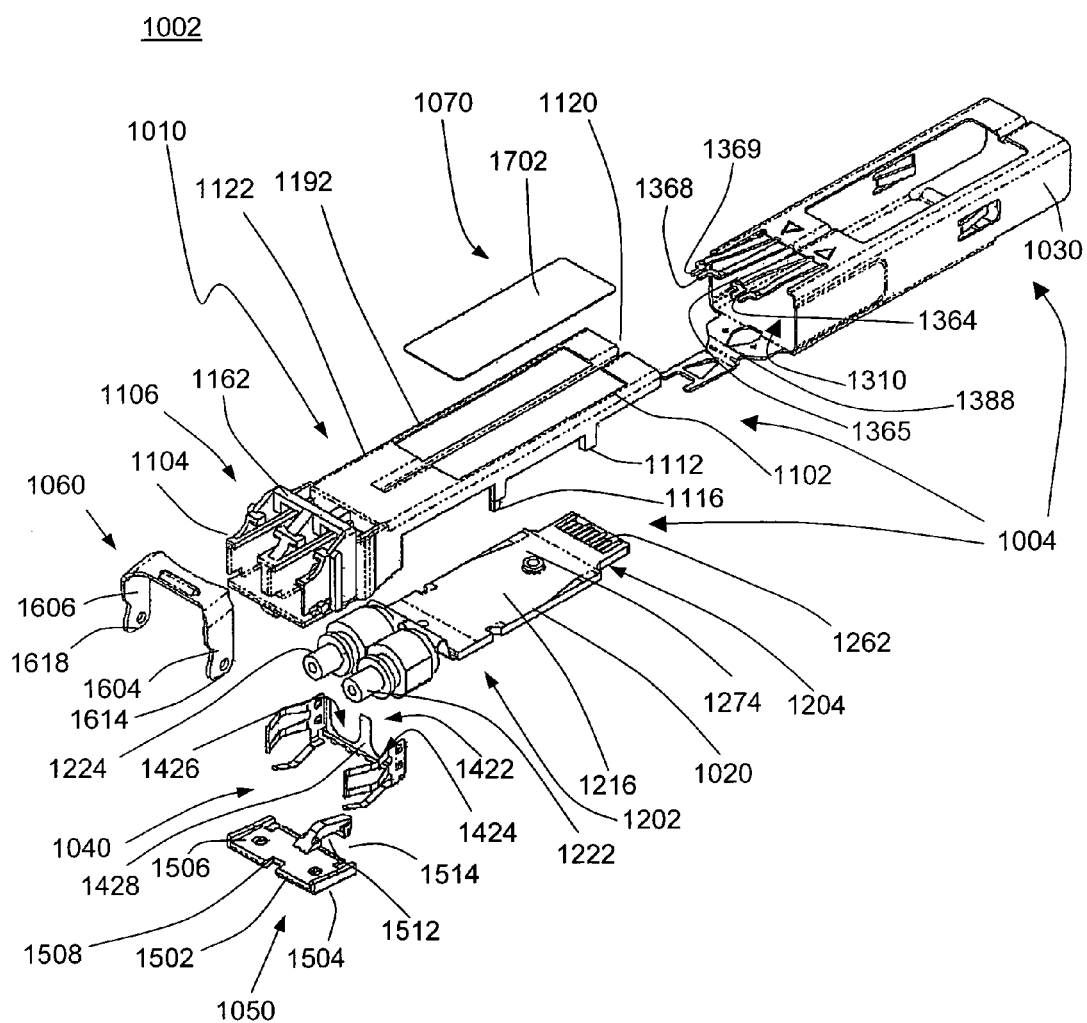
FIG. 1C is a top perspective exploded view of the transceiver module of FIG. 1A.
Figure 1D:
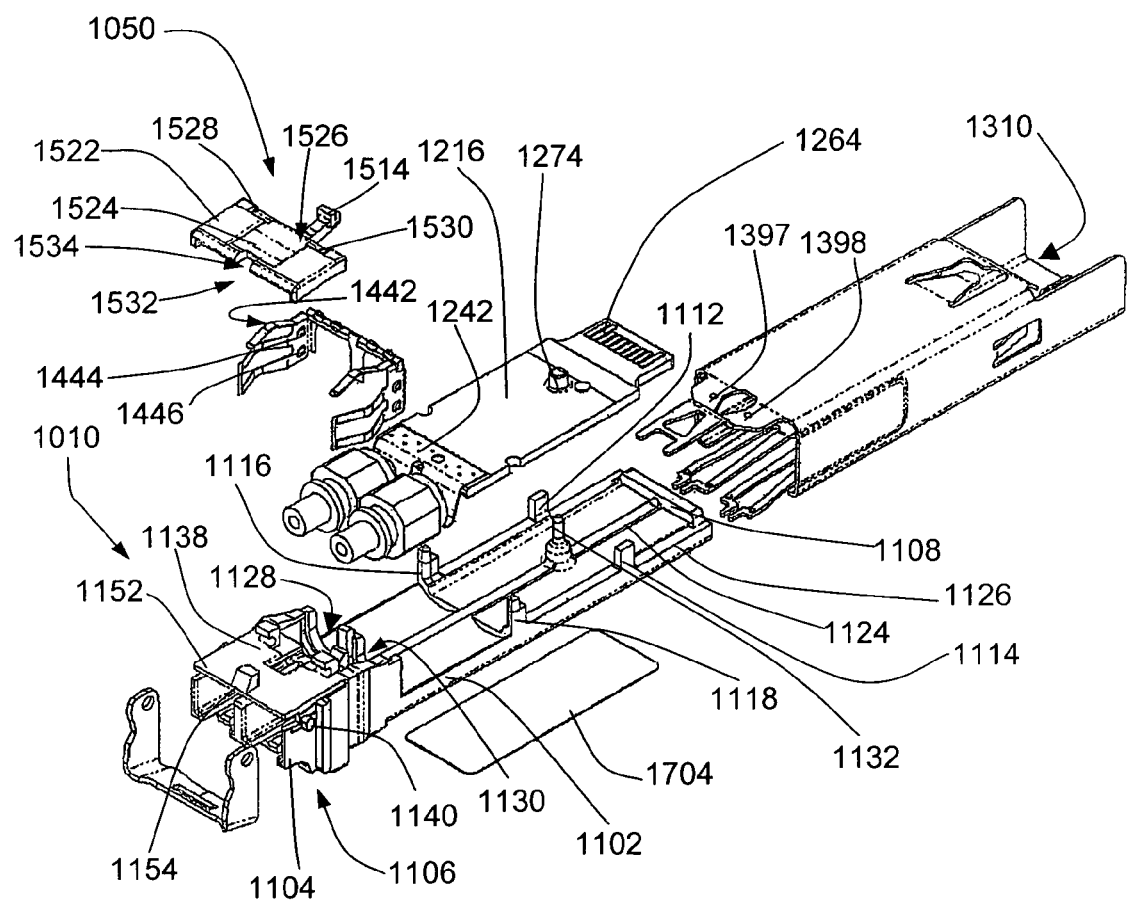
FIG. 1D is a bottom perspective exploded view of the transceiver module of FIG. 1A.
Figure 1E:
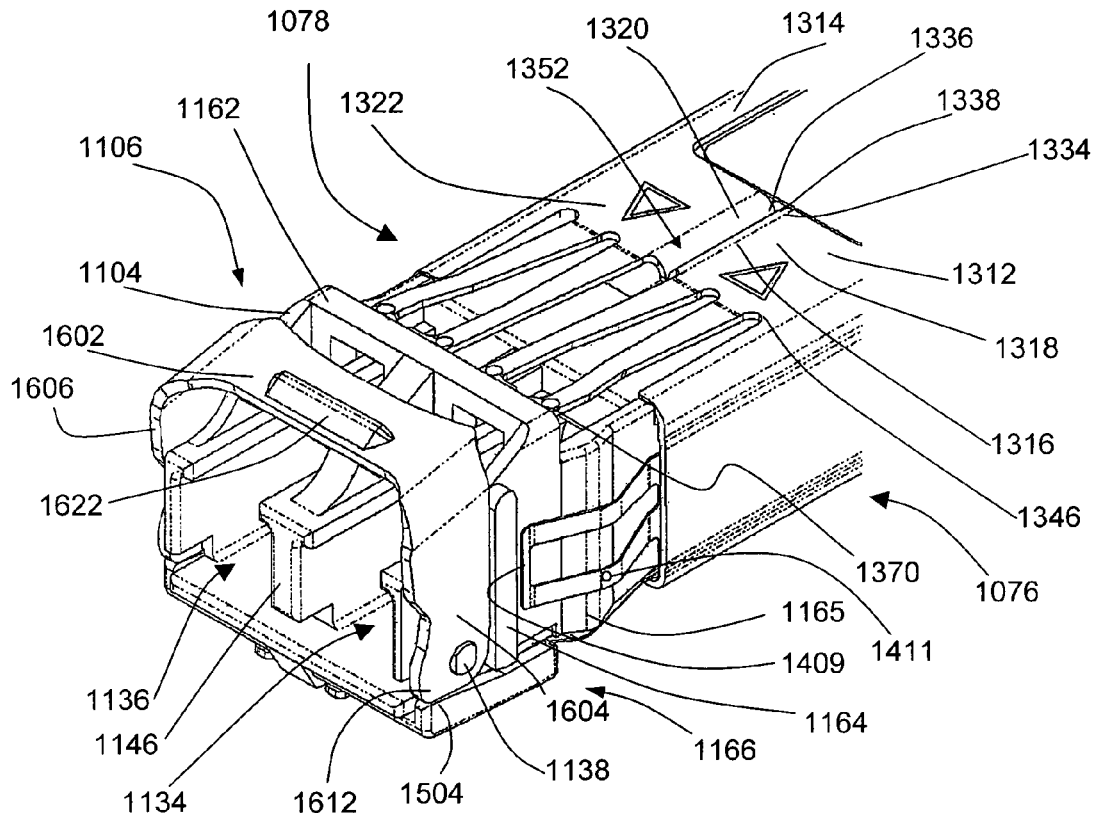
FIG. 1E is a top perspective view of a proximal end of the transceiver module of FIG. 1A viewed in a distal direction.
Figure 1F:
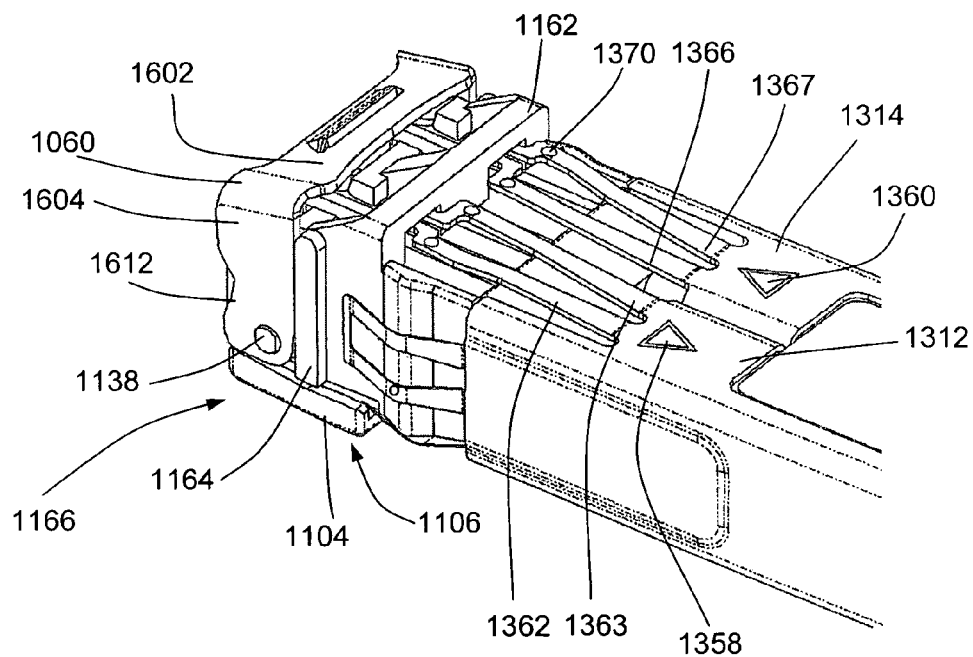
FIG. 1F is a top perspective view of a proximal end of the transceiver module of FIG. 1A viewed in a proximal direction.
Figure 1G:
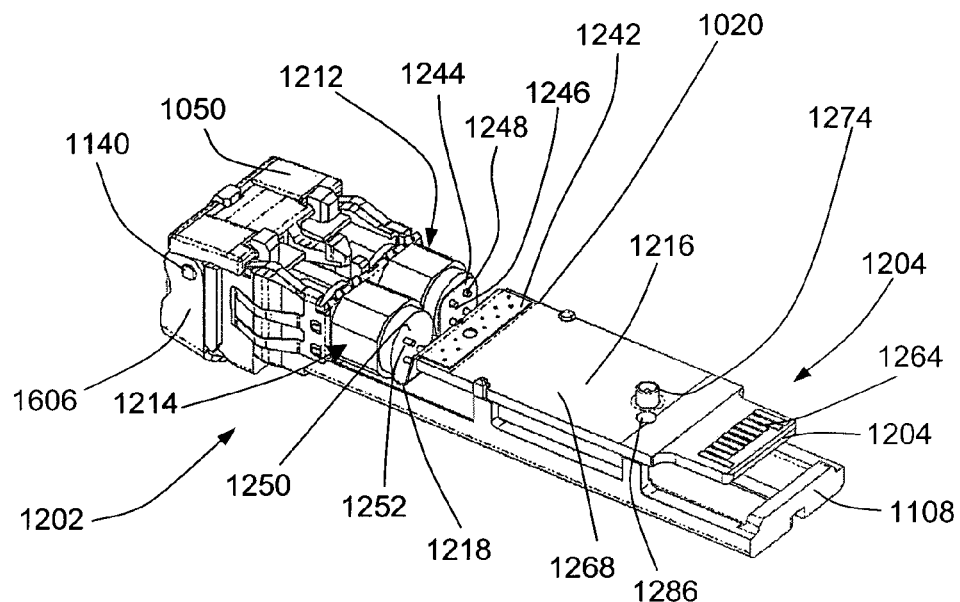
FIG. 1G is a top perspective view of the transceiver module of FIG. 1A viewed in a proximal direction with the transceiver housing removed to show internal structures.
Figure 1H:
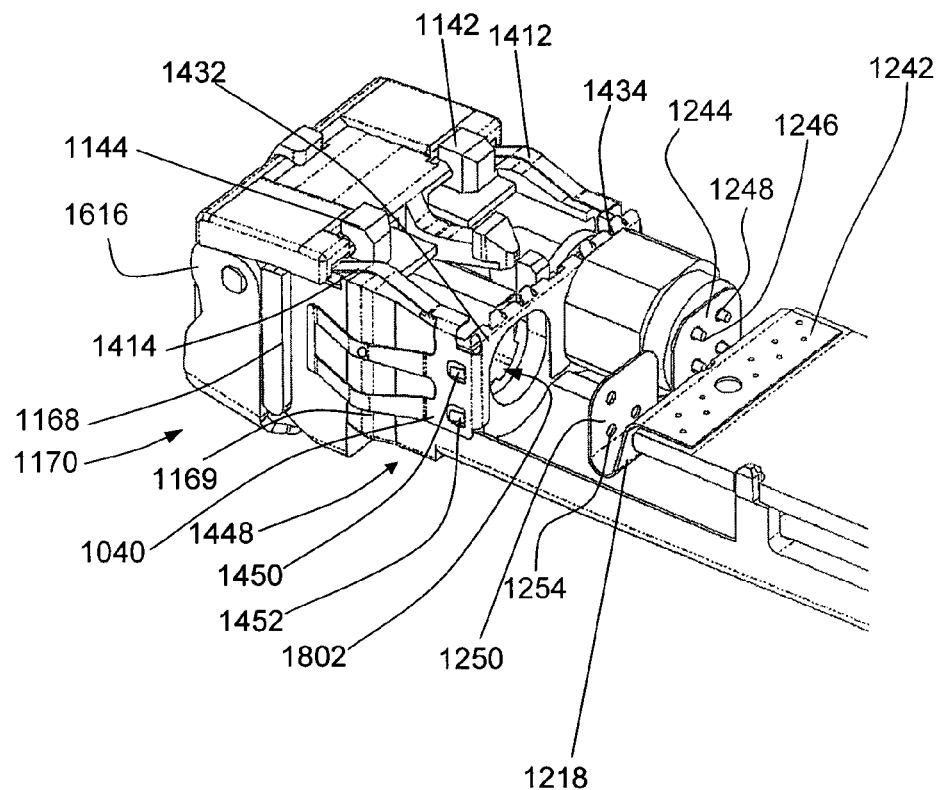
FIG. 1H is a top perspective view of a proximal end of the transceiver module of FIG. 1A viewed in a proximal direction with the transceiver housing and a lens and lens mount removed to show internal structures.
Figure 1I:
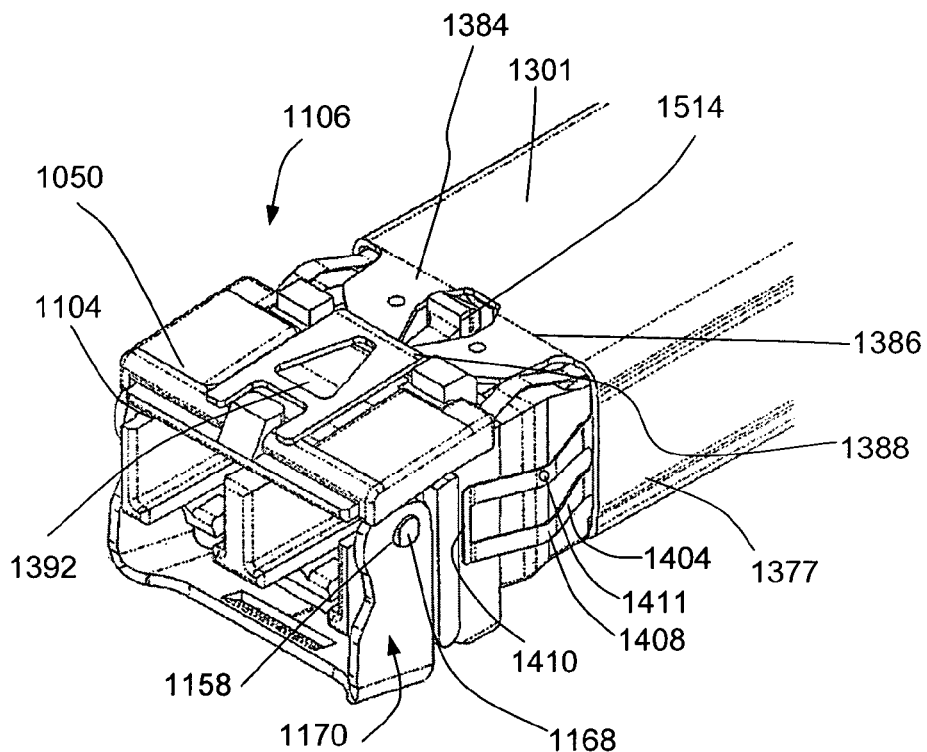
FIG. 1I is a bottom perspective view of a proximal end of the transceiver module of FIG. 1A viewed in a distal direction.
Figure 1J:
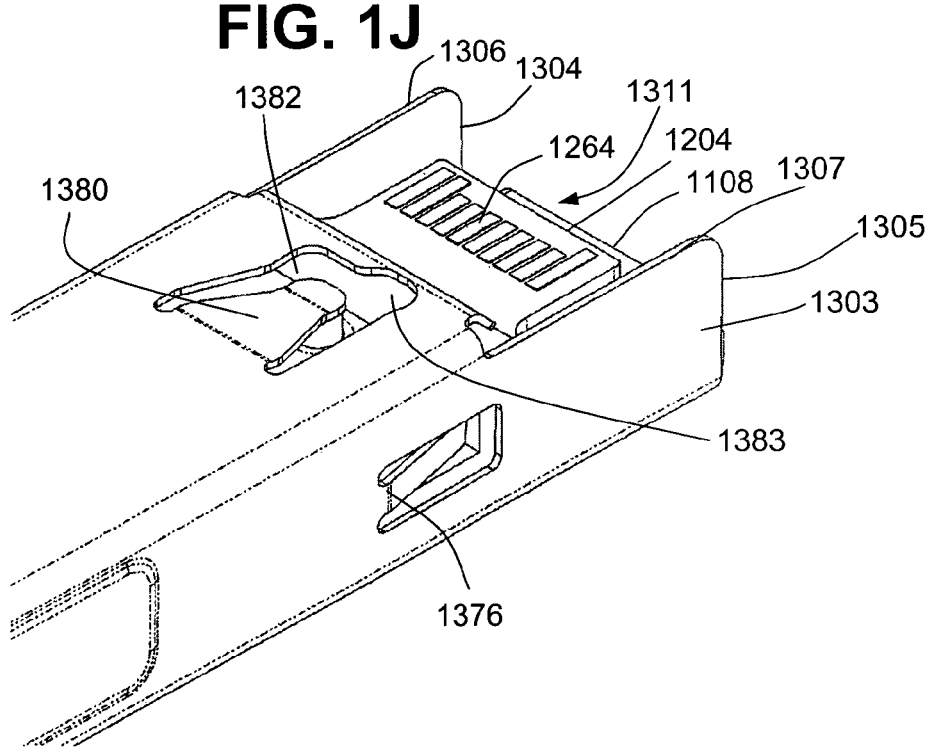
FIG. 1J is a bottom perspective view of a distal end of the transceiver module of FIG. 1A.
Figure 1K:
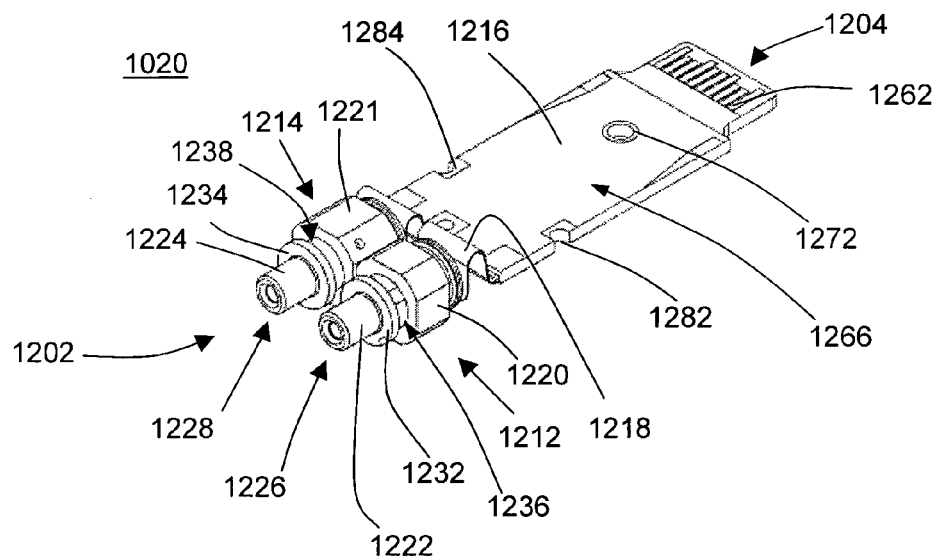
FIG. 1K is a top perspective view of the circuit board assembly of the transceiver module of FIG. 1A, with details of the circuit board, such as chips mounted on the circuit board, omitted for convenience.
Figure 1L:
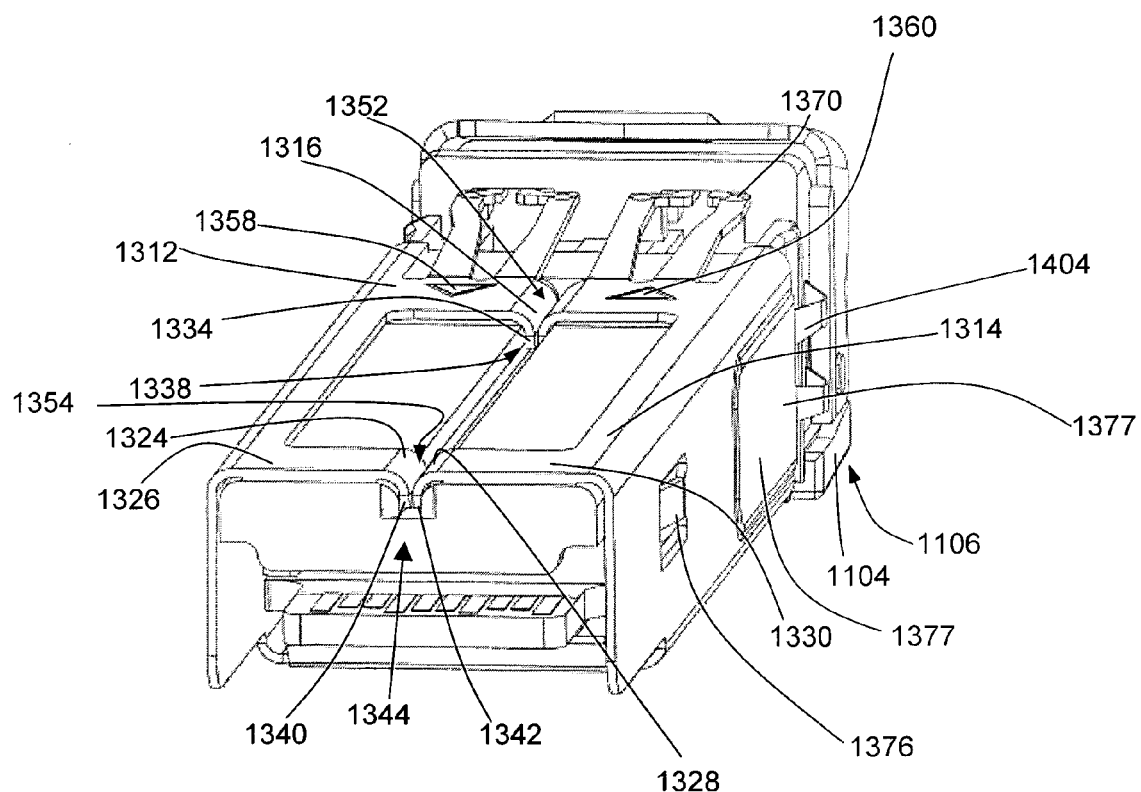
FIG. 1L is a distal perspective view of the transceiver module of FIG. 1A.

It is advantageous to define several terms before describing the invention. It should be appreciated that the following definitions are used throughout this application.

DEFINITIONS

Where the definition of terms departs from the commonly used meaning of the term, applicant intends to utilize the definitions provided below, unless specifically indicated.

For the purposes of the present invention, the term "transceiver" refers to an electrical or optical transmitter, an electrical or optical receiver, or an electrical or optical transceiver. Unless otherwise specified, a "transceiver" refers to an optical transceiver comprising two ports, one port comprising a transmit port and one port comprising a receive port.

For the purposes of the present invention, the term "proximal" refers to the end of a transceiver housing or transceiver cage in which an optical receptacle is mounted.

For the purposes of the present invention, the term "distal" refers to the end of a transceiver housing or transceiver cage of the present invention opposite to the proximal end.

For the purposes of the present invention, the term "inwards" refers to any direction towards the interior or a central axis of a transceiver module.

For the purposes of the present invention, the term "central axis" refers to an imaginary line drawn through the center of a transceiver module or assembly drawn between the proximal and distal ends of the transceiver module or assembly.

For the purposes of the present invention, the term "bottom" refers to the side of a transceiver module or assembly that includes exposed circuit board assembly contacts.

For the purposes of the present invention, the term "top" refers to the side of a transceiver module or assembly opposite to the bottom side of the transceiver module or assembly.

For the purposes of the present invention, the term "downwards" refers to the direction towards the bottom side of a transceiver module or assembly.

For the purposes of the present invention, the terms "left" and "right" refer to the left and right sides of a transceiver module or transceiver cage as viewed from the proximal end of the transceiver module or transceiver cage.

For the purposes of the present invention, the term "unibody construction" refers to a transceiver module or transceiver cage, or any part of a transceiver module that may be made from a single piece of material.

For the purposes of the present invention, the term "upwards" refers to the direction towards the top side of a transceiver module or assembly.

DESCRIPTION

FIGS. 1A, 1B, 1C, 1D, 1E, 1F, 1G, 1H, 1I, 1J, 1K and 1L illustrate a first embodiment of a transceiver module 1002. Transceiver module 1002 is comprised of transceiver frame 1010, a circuit board assembly 1020, a transceiver housing 1030 and a proximal clamp 1040. Transceiver module 1002 also includes a rocker 1050, a handle 1060 and a label 1070. Transceiver module 1002 includes a distal end 1072, a proximal end 1074, a receive side 1076 and a transmit side 1078.

Transceiver frame 1010 includes a base portion 1102 connected to optical receptacle 1104 at a proximal end 1106 of transceiver frame 1010. Transceiver frame 1010 also has a distal end wall 1108. Extending downwards from base portion 1102 are support tabs 1112 and 1114 and anti-rotation posts 1116 and 1118. A groove 1120 extends along a central axis of a top side 1122 of base portion 1102 and forms a ridge 1124 on a bottom side 1126 of base portion 1102. A mounting pin 1132 extends downwards from a position on ridge 1124. Transceiver frame 1010 also includes a right lens mount recess 1128 and a left lens mount recess 1130 Optical receptacle 1104 includes two openings 1134 and 1136, two handle pivot pins 1138 and 1140 and two curved rocker pivot rests 1142 and 1144. A wall 1146 separates openings 1134 and 1136. A flat base portion 1152 of optical receptacle 1104 includes an abutment tab 1154. At the top of optical receptacle 1104 is a top finger rib 1162. Optical receptacle 1104 also includes a right side finger protection rib 1164 and right side hump 1165 on a right side 1166 of optical receptacle 1104 and a left side finger protection rib 1168 and a left side hump 1169 on a left side 1170 of optical receptacle 1104. Top side 1122 includes a top recess 1192.

Preferably, the transceiver frame of the present invention is made of a cast metal, such as cast zinc and, furthermore, may be metallized, for example, with nickel.

Circuit board assembly 1020 has a proximal end 1202 and a distal end 1204 and comprises optical subassemblies 1212 and 1214 that are joined to a printed circuit board 1216 by flex circuit 1218. Optical subassemblies 1212 and 1214 comprise lens mounts 1220 and 1221, respectively, and barrel lenses 1222 and 1224, respectively. Barrel lenses 1222 and 1224 include proximal ends 1226 and 1228 and ring sections 1232 and 1234, respectively. Between ring sections 1232 and 1234 and lens mounts 1220 and 1221, respectively, are gaps 1236 and 1238, respectively. Flex circuit 1218 includes a flex-board contact 1242 that mounts and electrically contacts flex circuit 1218 to circuit board 1216. Optical subassembly 1212 is mounted and electrically contacted to right portion 1244 of flex circuit 1218 by contact pins 1246 of optical subassembly 1212 that extend through openings 1248 of flex circuit 1218. Left optical subassembly 1214 is mounted and electrically contacted to a left portion 1250 of flex circuit 1218 by contact pins 1252 of optical subassembly 1214 that extend through openings 1254 in flex circuit 1218. Top contacts 1262 and bottom contacts 1264 are located on a top surface 1266 and a bottom surface 1268, respectively, of printed circuit board 1216 at a distal end 1204. Along a central axis of top surface 1266 is a pin receptacle 1272 having a latched bottom end 1274 extending perpendicularly from bottom surface 1268. Printed circuit board 1216 includes two side recesses 1282 and 1284. A setup contact 1286 on printed circuit board 1216 provides additional electrical access to transceiver module 1002, for example, in order to allow automated setup of transceiver module 1002.

The circuit board assembly of the present invention is similar in form to assemblies such as the assemblies described in U.S. patent application Ser. No. 09/635,102, the entire contents and disclosure of which is hereby incorporated by reference.

Transceiver housing 1030 has a top side 1300, a bottom side 1301 and a right side 1302, and a left side 1303. Transceiver housing 1030 also includes a right distal end 1304, left distal end 1305, right bottom distal end 1306, left bottom distal end 1307, right top distal end 1308, and left top distal end 1309. Transceiver housing 1030 is hollow and includes a proximal opening 1310 and a distal opening 1311. Top side 1300 includes a right portion 1312 and a left portion 1314. A proximal right flange 1316 extends downwardly from a proximal part 1318 of right portion 1312. A proximal left flange 1320 extends downwardly from a proximal part 1322 of left portion 1314. A distal right flange 1324 extends downwardly from a distal part 1326 of right portion 1312. A distal left flange 1328 extends downwardly from a distal part 1330 of left portion 1314. Proximal right flange 1316 and proximal left flange 1320 abut each other at bottom edges 1334 and 1336, respectively, to form a proximal ridge 1338. Distal right flange 1324 and distal left flange 1328 abut each other at bottom edges 1340 and 1342, respectively, to form a distal ridge 1344. At a top surface 1346 of top side 1300, there is a proximal gap 1352 between proximal right portion 1318 and proximal left portion 1322 and a distal gap 1354 between distal right portion 1326 and distal left portion 1328. A right arrow 1358 is inscribed in proximal part 1318 and a left arrow 1360 is inscribed in proximal part 1322. Right arrow 1358 may point toward distal end 1072 of transceiver module 1002 to indicate data coming into receive side 1076 transceiver module 1002, and left arrow 1360 may point toward proximal end 1074 of transceiver module 1002 to indicate data going out of transmit side 1078 of transceiver module 1002. Right finger springs 1362 and 1363 extend proximally from proximal right portion 1312, are biased upwardly, and include finger spring ends 1364 and 1365, respectively. Left finger springs 1366 and 1367 extend proximally from proximal left portion 1314, also biased upwardly, and include finger spring ends 1368 and 1369, respectively. Finger springs 1362, 1363, 1366 and 1367 each include a finger dimple 1370. Top side 1300 includes a top opening 1372, which is preferably slightly larger than label 1070. Right side 1304 includes a right side spring 1374 that is biased inwardly and a right side bulge 1375. Left side 1306 includes a left side spring 1376 that is biased inwardly and a left side bulge 1377. Bottom side 1302 includes an upwardly biased pin receptacle spring 1380 and a bottom side opening 1382. An access portion 1383 or bottom side opening 1382 allows access to setup contact 1286, for example by a pogo-pin electrical probe (not shown). A rocker return spring 1384 extends proximally from a proximal end 1386 of bottom side 1302 and includes a bend 1388, a triangular opening 1392, and two prongs 1393 and 1394. Proximal end 1386 includes a pin opening 1396 and two bottom dimples 1397 and 1398 on either side of pin opening 1396. Right distal end 1304, left distal end 1305, right bottom distal end 1306, left bottom distal end 1307, right top distal end 1308, and left top distal end 1309, all of transceiver housing 1030, and distal end wall 1108 of transceiver frame 1010 all extend farther in the distal direction than distal end 1204 of circuit board assembly 1020, i.e. distal end 1204 of circuit board assembly 1020 does not protrude from the assembly of transceiver frame 1010 and transceiver housing 1030.

The transceiver housing of the present invention preferably has a unibody construction and is formed by cutting, bending and punching a single sheet of a metal such as steel.

Proximal clamp 1040 has inwardly biased side springs 1402 and 1404 that include respective bends 1406 and 1408. Side springs 1402 and 1404 may comprise a plurality of fingers, which may be joined by joining sections 1409 and 1410, respectively. Bend 1406 and bend 1408 include a dimple 1411. Proximal clamp 1040 also includes two upwardly biased bottom finger springs 1412 and 1414. A lens-engaging portion 1422 of proximal clamp 1040 includes two recessed regions 1424 and 1426 and a vertical piece 1428. Along an lower edge 1432 of proximal clamp 1040 are top internal EMI tabs 1434. Clamp right side 1442 includes right side internal EMI tabs 1444 and 1446 and clamp left side 1448 includes left side internal EMI tabs 1450 and 1452.

The proximal clamp of the present invention preferably has a unibody construction and is formed by cutting, bending and punching a single sheet of a metal such as steel.

Rocker 1050 includes a body portion 1502 including two raised edges 1504 and 1506. Extending from a top surface 1508 of body portion 1502 is a curved arm 1512 including a rocker pin 1514. A bottom surface 1522 of body portion 1502 includes a shallow recess 1524. At a distal end 1526 of rocker 1050 are right recess pivot 1528 and left recess pivot 1530. Right recess pivot 1528 and left recess pivot 1530 are joined to shallow recess 1524. At a proximal end 1532 of rocker 1050 is a notch 1534.

Preferably, the rocker of the present invention is made of a cast metal, such as cast zinc and, furthermore, may be metallized, for example, with nickel.

Handle 1060 has a cross piece 1602 and two handle arms 1604 and 1606. Arm 1604 includes a cam 1612 and a pivot hole 1614 and arm 1606 includes a cam 1616 and a pivot hole 1618. Cross piece 1602 includes a slot 1622.

The handle of the present invention preferably has a unibody construction and is formed by cutting, bending and punching a single sheet of a metal such as stainless steel.

Label 1070 has a top side 1702 and a bottom side 1704. Bottom side 1704 includes an adhesive.

The label of the present invention may be made of any type of material that may be adhered to metal such as a piece of tape, a sticker, etc. The label may include various types of indicia on the top side relating to the manufacturer of the transceiver module, the serial number of the transceiver module, a bar code, etc.

When circuit board assembly 1020 is mounted on transceiver frame 1010 a mounting pin 1132 of transceiver frame 1010 extends into a pin receptacle 1272 in printed circuit board 1216 of circuit board assembly 1020. Anti-rotations posts 1116 and 1118 extend through side recesses 1282 and 1284, respectively, of printed circuit board 1216. Support tabs 1112 and 1114 of transceiver frame 1010 support printed circuit board 1216. Gaps 1236 and 1238 of respective optical subassemblies 1212 and 1214 of circuit board assembly 1020 rest in respective recesses 1128 and 1130 of transceiver frame 1010. Barrel lenses 1222 and 1224 extend into distal ends (not shown) of respective openings 1134 and 1136 of optical receptacle 1104.

Circuit board assembly 1020 is held onto transceiver frame 1010 by proximal clamp 1040. Recessed regions 1424 and 1426 and a vertical piece 1428 fit into gaps 1236 and 1238, respectively to form a right opening 1802 and a left opening (not shown). Side springs 1402 and 1404 of proximal clamp 1040 are biased inwardly so that side springs 1402 and 1404 are forced against sides 1166 and 1170, respectively, of optical receptacle 1104. Bends 1406 and 1408 of side springs 1402 and 1404 bend around side humps 1165 and 1169, respectively, of optical receptacle 1104.

Circuit board assembly 1020 and transceiver frame 1010 are further held together by transceiver housing 1030 that fits around circuit board assembly 1020 and transceiver frame 1010. Pin receptacle spring 1380 is biased upwardly so that pin receptacle spring 1380 presses against latched bottom end 1274 of pin receptacle 1272 to insure that mounting pin 1132 remains lodged in pin receptacle 1272 to hold transceiver frame 1010 in place with respect to transceiver housing 1030. Right side spring 1374 and left side spring 1376 abut support tabs 1112 and 1114 to also hold transceiver frame 1010 in place with respect to transceiver housing 1030. Right side bulge 1375 and left side bulge 1377 fit over side springs 1402 and 1404, respectively, making electrical contact with internal EMI tabs 1444 and 1446 and internal EMI tabs 1450 and 1452. Finger spring ends 1364, 1365, 1368 and 1369 fit under and press upwardly on top finger rib 1162, making electrical contact between finger spring ends 1364, 1365, 1368 and 1369, and top finger rib 1162. Bottom finger springs 1412 and 1414 of proximal clamp 1040 are biased upwardly so that bottom springs 1412 and 1414 are forced against base region 1152, of optical receptacle 1104, making electrical contact between bottom springs 1412 and 1414 and base region 1152. Label 1700 is applied in top recess 1192.

Rocker 1050 is held on base region 1152, of optical receptacle 1104 by rocker return spring 1384 by the interaction of right recess pivot 1528 and left recess pivot 1530 and rocker pivot rests 1142 and 1144, respectively. Rocker return spring 1384 lies in shallow recess 1524. Notch 1534 abuts abutment tab 1154.

Handle 1060 is pivotably mounted on optical receptacle 1104 by pivot holes 1614 and 1618 and pivot pins 1138 and 1140.

FIGS. 1A, 1B, 1E, 1F, 2A, 2B, 3A and 3B illustrate the operation of a transceiver module 1002 of the present invention.

FIGS. 1A, 1B, 1E and 1F illustrate transceiver module 1002 in a latched position 1092. As described above, in latched position 1092, handle 1060 is in an upright position and right and left handle arms 1604 and 1606 rest against right and left side finger protection ribs 1164 and 1168, respectively. The cams 1612 and 1616 that abut raised edges 1504 and 1506 of rocker 1050 prevent handle 1060 from pivoting without force being applied. Rocker 1050 is held against base portion 1152 of optical receptacle 1104 by rocker return spring 1384. Rocker pin 1514 extends through pin opening 1396 of transceiver housing 1030.

Figure 2A:
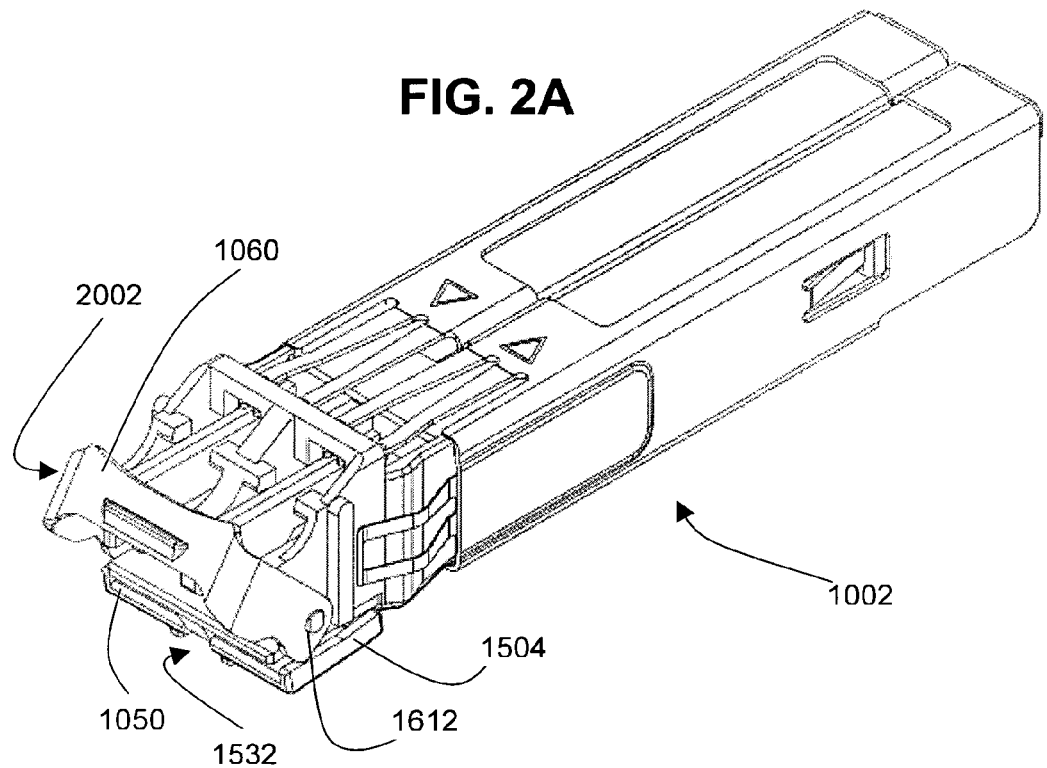
FIG. 2A is a top perspective view of the transceiver module of FIG. 1A with the handle pivoted to an midstroke position.
Figure 2B:
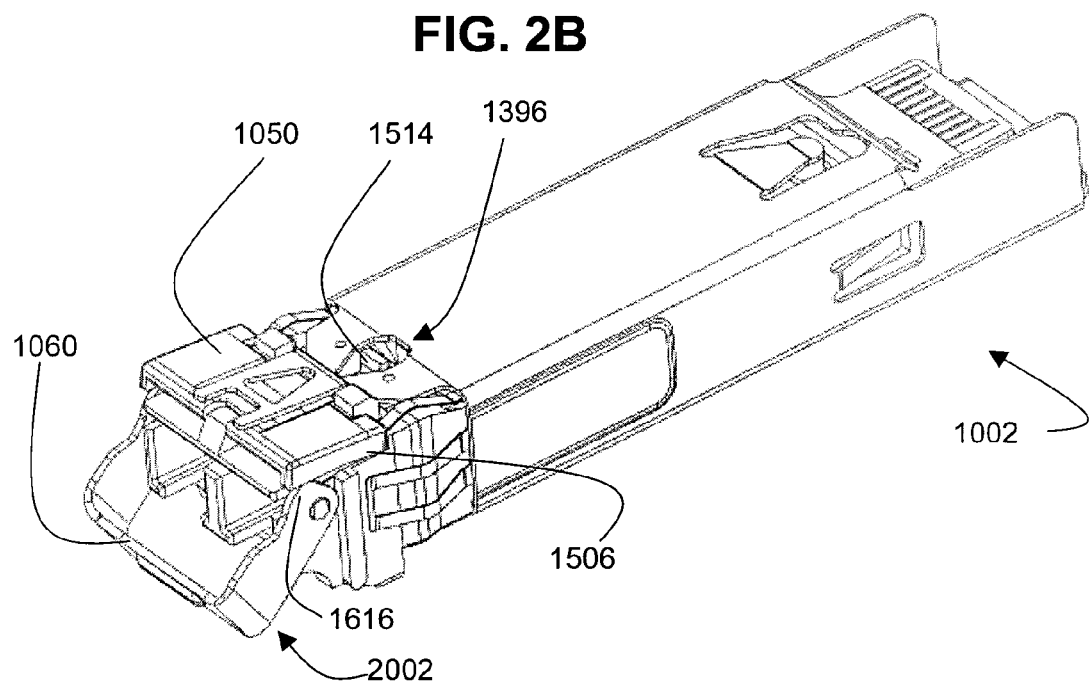
FIG. 2B is a bottom perspective view of the transceiver module of FIG. 2A.

FIGS. 2A and 2B illustrate transceiver module 1002 in a midstroke position 2002 (Label 1070 has been removed to show greater detail). Handle 1060 has been pivoted to so that cams 1612 and 1616 have been pivoted to a position such that cams 1612 and 1616 press against raised edges 1504 and 1506, respectively, thereby forcing proximal end 1532 of rocker 1050 downwards and simultaneously causing rocker pin 1514 to retract into pin opening 1396 in a rocking movement.

Figure 3A:
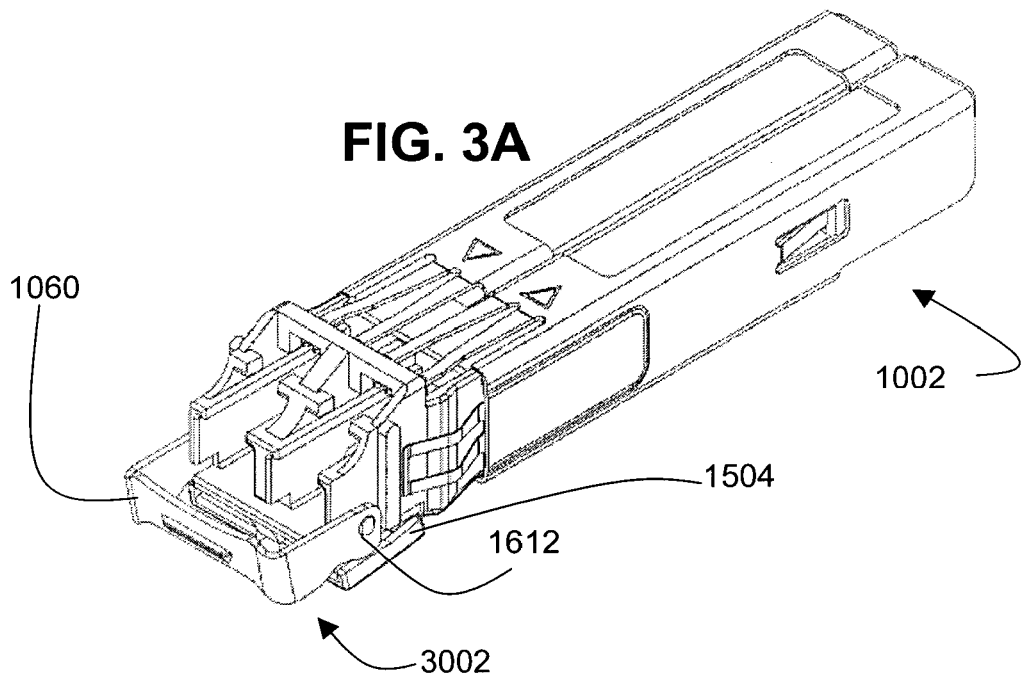
FIG. 3A is a top perspective view of the transceiver module of FIG. 1A with the handle pivoted to an unlatched position.
Figure 3B:
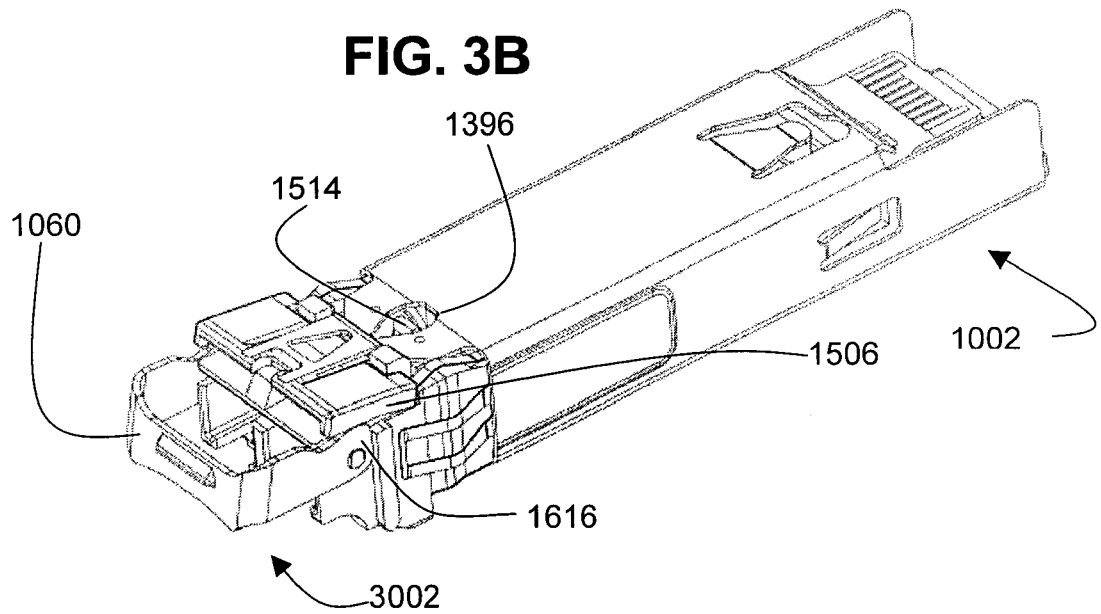
FIG. 3B is a bottom perspective view of the transceiver module of FIG. 3A.
Figure 4A:
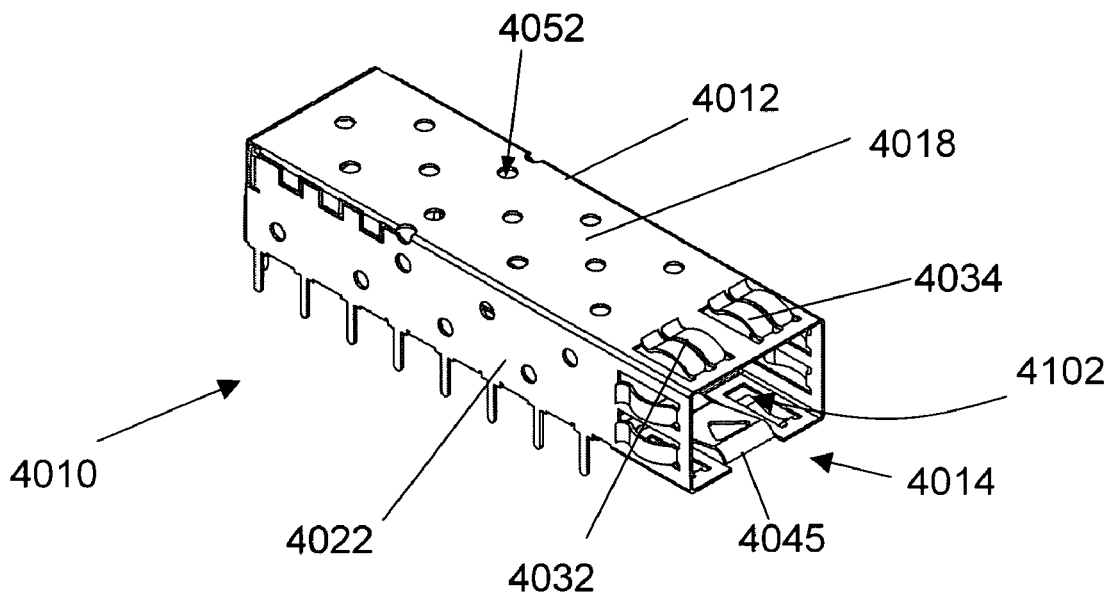
FIG. 4A is a top perspective view of a transceiver cage of the present invention.
Figure 4B:
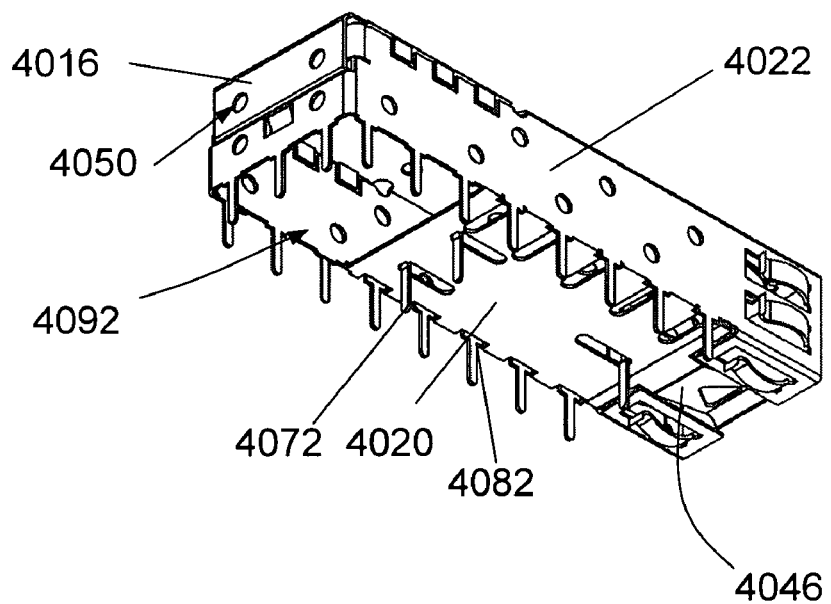
FIG. 4B is a bottom perspective view of the transceiver cage of FIG. 4A.
Figure 4C:
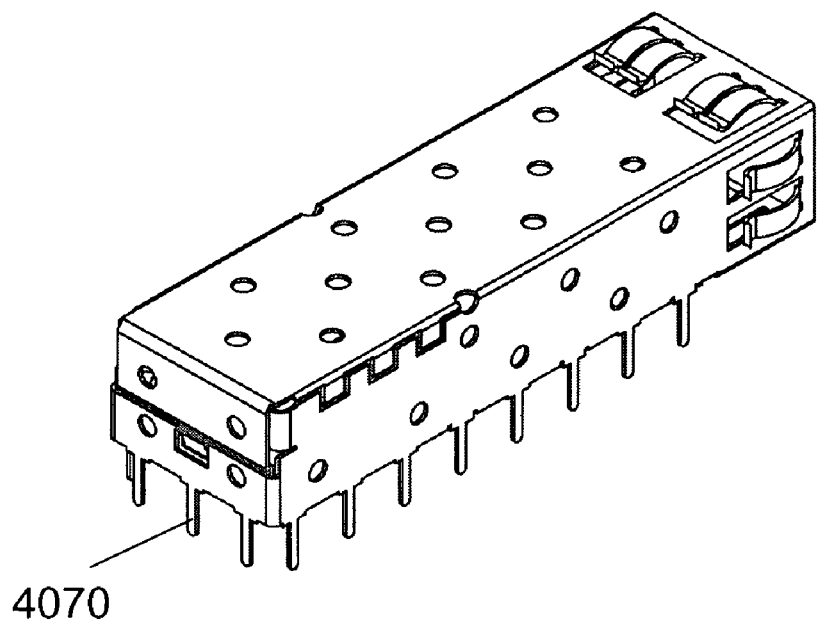
FIG. 4C is a top perspective view of the transceiver cage of FIG. 4A from a different angle.
Figure 4D:
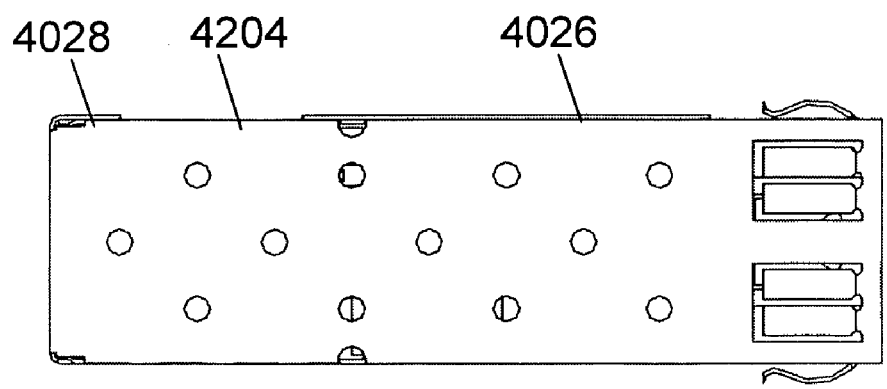
FIG. 4D is a top plan view of the transceiver cage of FIG. 4A.
Figure 4E:
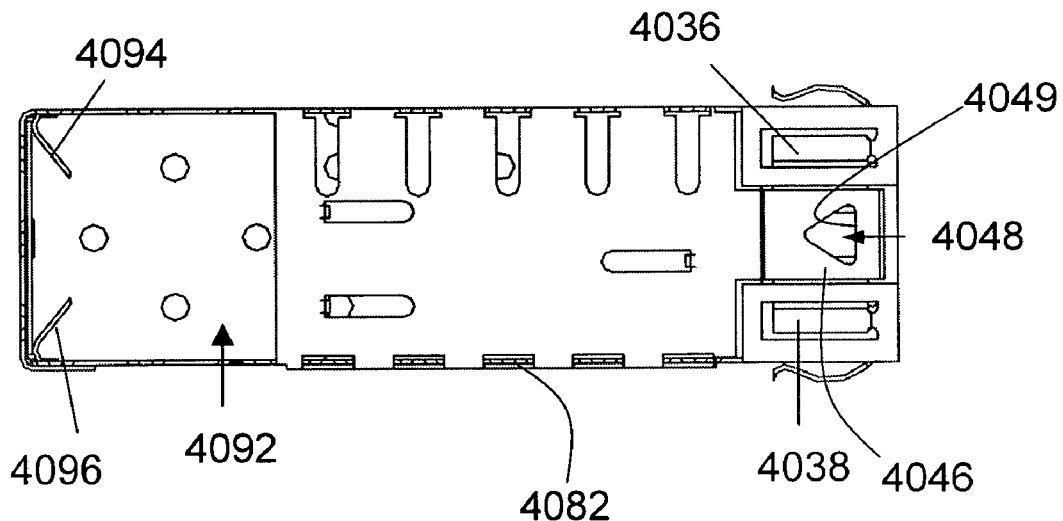
FIG. 4E is a bottom plan view of the transceiver cage of FIG. 4A.
Figure 4F:
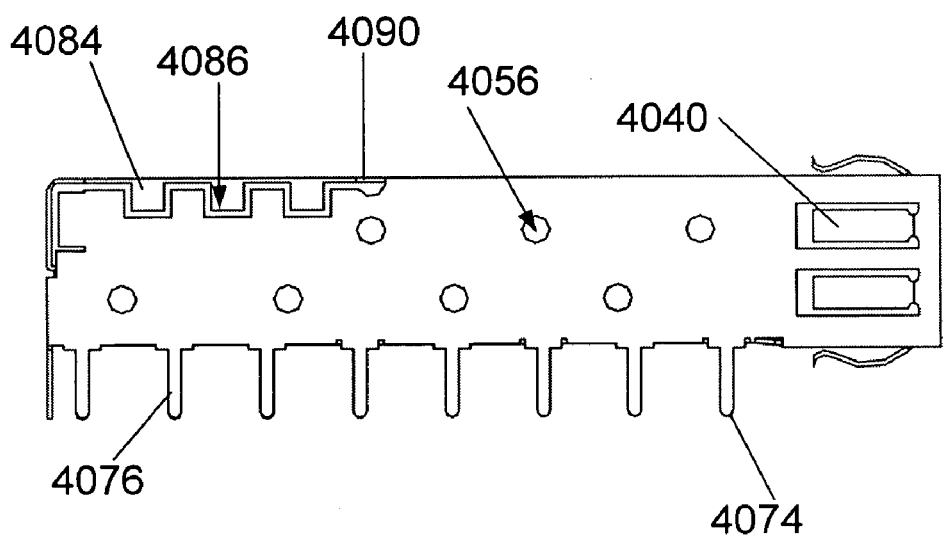
FIG. 4F is a left plan view of the transceiver cage of FIG. 4A.
Figure 4G:
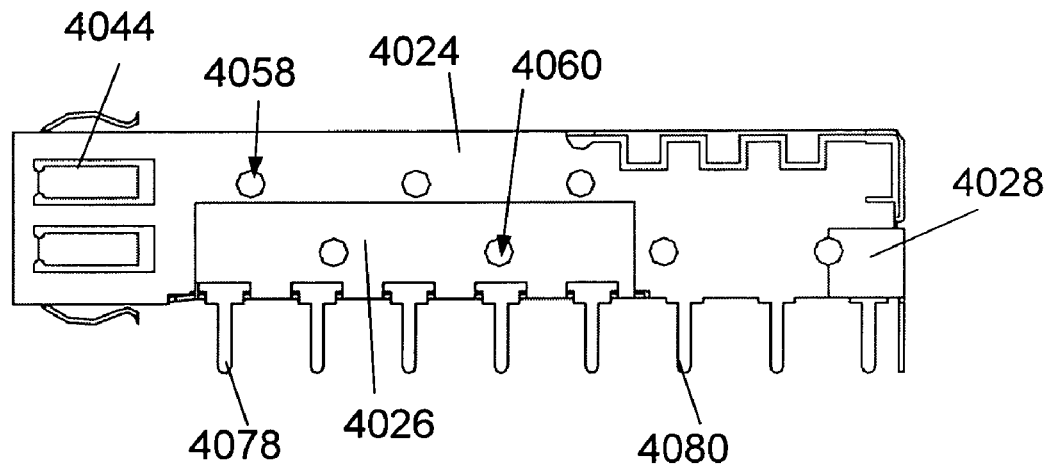
FIG. 4G is a right plan view of the transceiver cage of FIG. 4A.
Figure 4H:
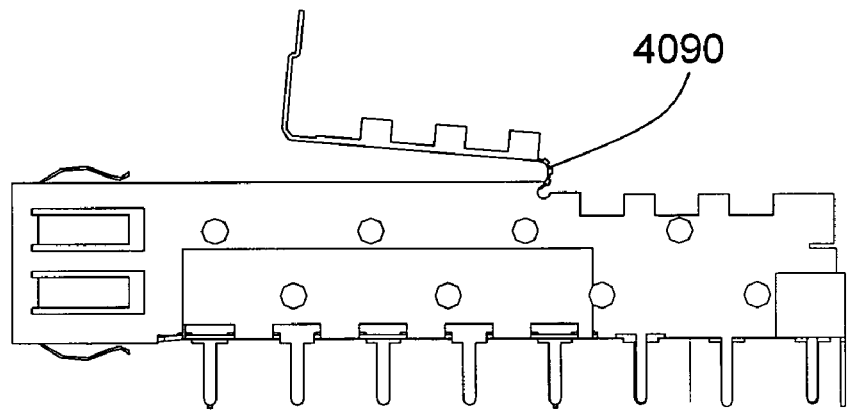
FIG. 4H is a right plan view of the transceiver of FIG. 4F with an access door of the transceiver cage in an unlatched position.
Figure 4I:
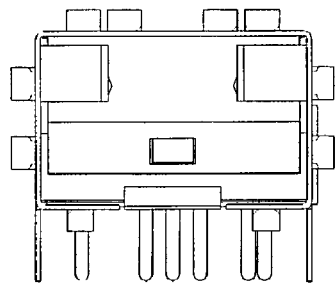
FIG. 4I is a proximal view of the transceiver cage of FIG. 4A.
Figure 4J:
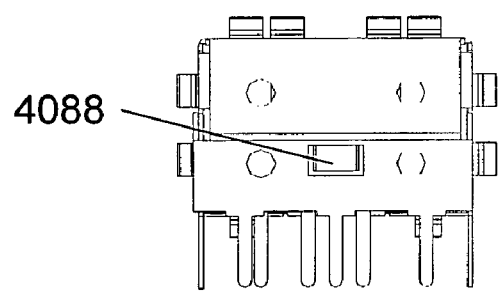
FIG. 4J is a distal view of the transceiver cage of FIG. 4A.

FIGS. 3A and 3B illustrate transceiver module 1002 in an unlatched position 3002 (Label 1070 has been removed to show greater detail). Handle 1060 has been pivoted to a horizontal position such that cams 1612 and 1616 exert their maximum force on raised edges 1504 and 1506, respectively, and rocker pin 1514 is entirely retracted into pin opening 1396 as a result. The term "latched" refers to the ability of rocker pin 1514 to lock transceiver module 1002 in a transceiver cage, as described in detail below. When transceiver module 1002 is in unlatched position 3002, transceiver frame 1010 remains mounted in transceiver housing 1030.

FIGS. 4A, 4B, 4C, 4D, 4E, 4F, 4G, 4H, 4I, and 4J illustrate a transceiver cage 4010 of the present invention for use with transceiver module 1002. Transceiver cage 4010 includes a body portion 4012 including a proximal open end 4014, a distal wall 4016, a top portion 4018, a bottom portion 4020, a left side 4022, a right side 4024, and a right side flap 4026. A right back flap 4028 extends from distal wall 4016 and is bent to abut right side 4024. Proximal open end 4014 includes two top left internal contact fingers 4032, two top right internal contact fingers 4034, one bottom left internal contact finger 4036, one bottom right internal contact finger 4038, two left internal contact fingers 4040, two right internal contact fingers 4044, and a catch 4045 at a proximal end of a bottom spring 4046 having a triangular opening 4048 having a proximal edge 4049. Spring 4046 is biased upwardly.

Also the embodiment of the transceiver cage described above includes a specific number of contact fingers on each side, it is to be appreciated that the number of contact fingers on any of the sides is exemplary and that any number of contact fingers may be used on any of the sides.

Distal wall 4016 includes radiation control openings 4050, top portion 4018 includes radiation control openings 4052, left side 4022 includes radiation control openings 4056, right side 4024 includes radiation control openings 4058, and right side flap 4026 includes radiation control openings 4060. Extending from distal wall 4016 are distal mounting pins 4070, extending from bottom portion 4020 are bottom mounting pins 4072, extending from left side 4022 are left proximal mounting pins 4074 and left distal mounting pins 4076, and extending from right side 4024 are right proximal mounting pins 4078 and right distal mounting pins 4080. Right proximal mounting pins 4078 extend through locking openings 4082 in bottom portion 4020, thereby causing right side flap 4026 to abut against and be in electrical contact with right side 4024. Left side 4022 includes an optional access door 4084 with zigzag slot 4086 for EMI control. Access door 4084 provides access to receptacle 330 mounted in transceiver cage 4010 for inspection or rework to insure that there are no loose pieces to track or align. A door latch 4088 keeps access door 4084 in place when latched. A hinge 4090 is formed from etched or stamped lines to allow several actuations of door 4084 without metal fatigue breakage. In use, transceiver cage 4010 is mounted on a printed wiring board (not shown). Transceiver cage 4010 also includes an opening 4092 (see FIG. 4E) and left distal spring 4094 and right distal spring 4096. Transceiver 4010 has an inner surface comprising all of the interior sides of transceiver cage 4010 indicated generally by arrow 4102.

Although the embodiment of the cage described above includes an access door, other embodiments of the cage of the present invention may not include an access door.

Preferably, when the transceiver cage of the present invention is made of a single sheet of metal, the part of the transceiver cage are made by punching out holes, partially punching out features such mounting pins, and by bending the metal sheet and punched out features as appropriate to form an assembled transceiver cage, such as shown in FIGS. 4A–J.

In a preferred embodiment, the transceiver cage is held together by welding overlapping portions of the transceiver cage to each other. For example, the right side flap and the right back flap of the transceiver cage shown in FIGS. 4A–J may each be welded to the right side of the transceiver cage.

Suitable transceiver cages for use with the transceiver assembly of the present invention are described in U.S. patent application Ser. No. 09/635,102, the entire contents and disclosure of which is hereby incorporated by reference.

Figure 9:
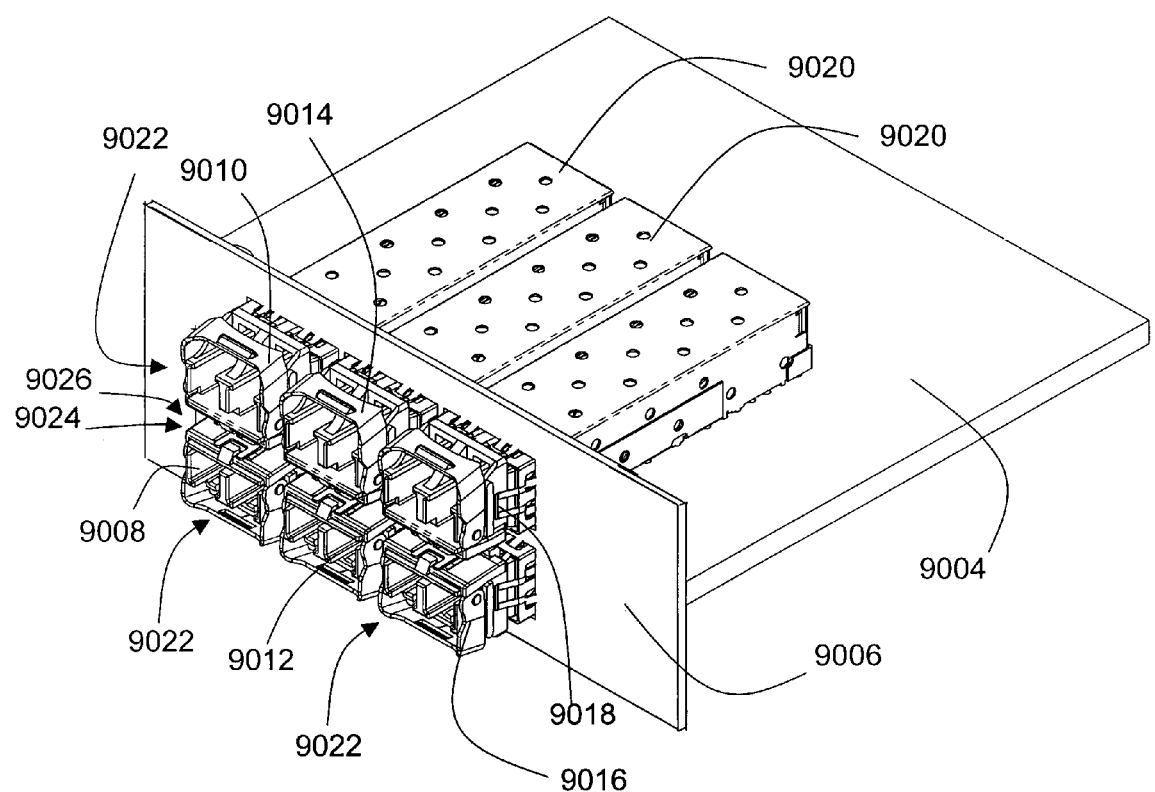
FIG. 9 is a perspective view of a multi-transceiver structure of the present invention including 6 transceivers, a PWA and a chassis panel.

The transceiver cage of the present invention includes contact fingers at the proximal open end that are intended to make electrical contact around the inner surface of a chassis panel through which the transceiver cage is inserted and from which the transceiver cage protrudes (see FIG. 9 and accompanying description). The design of the transceiver cage provides a minimal open aperture between the internal contact fingers to minimize the wavelength of any electromagnetic energy available to pass through the chassis opening. The transceiver cage of the present invention also provides a high number of contact fingers that maximize the probability and quality of electrical contact in the case of misalignment between the chassis and the cage and in the case of a non-optimally dimensioned chassis opening. For these reasons, the design of the transceiver housing preferably minimizes electromagnetic radiation from the chassis to the cage interface and provides a low resistance path between the receptacle and chassis for electrostatic discharge currents.

The transceiver cage of the present invention includes mounting pins protruding from the bottom of the transceiver cage in sufficient quantity to minimize the physical spacing so as to minimize the electromagnetic aperture and wavelength of any electromagnetic radiation that may be available to pass through. The large number of mounting pins also ensure a short return path for electromagnetic currents attempting to reach the chassis or signal potential in the host PWA. The mounting pins have a pin length sufficient to hold the cage rigidly in the host PWA during the soldering (or pressing) process and to ensure overlap of the mounting pins and the deepest grounding or signal common plane in the PWA for the shortest electromagnetic return path.

The transceiver cage may be made from a continuous piece of metal to thereby maximize EMI shielding performance of the cage by providing minimal impedance to electromagnetic currents flowing around the cross section of the cage.

The radiation control openings facilitate convective or forced air flow through the cage, facilitate the entry and exit of PWA washing fluids, and minimize the wavelength of electromagnetic energy that may be available to escape from or pass into the transceiver cage. Preferably, the longest dimension of each of the radiation control openings is no greater than ¼ of the wavelength of the electromagnetic radiation corresponding to ten times the highest signal frequency present in the transceiver circuitry.

Although the transceiver cage of FIGS. 4A–4J has a unibody construction and includes an access door, various types of transceiver cages may be used with the transceiver assembly of the present invention and such transceiver cages may be made from two or more pieces of material and may not include an access door.

Figure 5A:
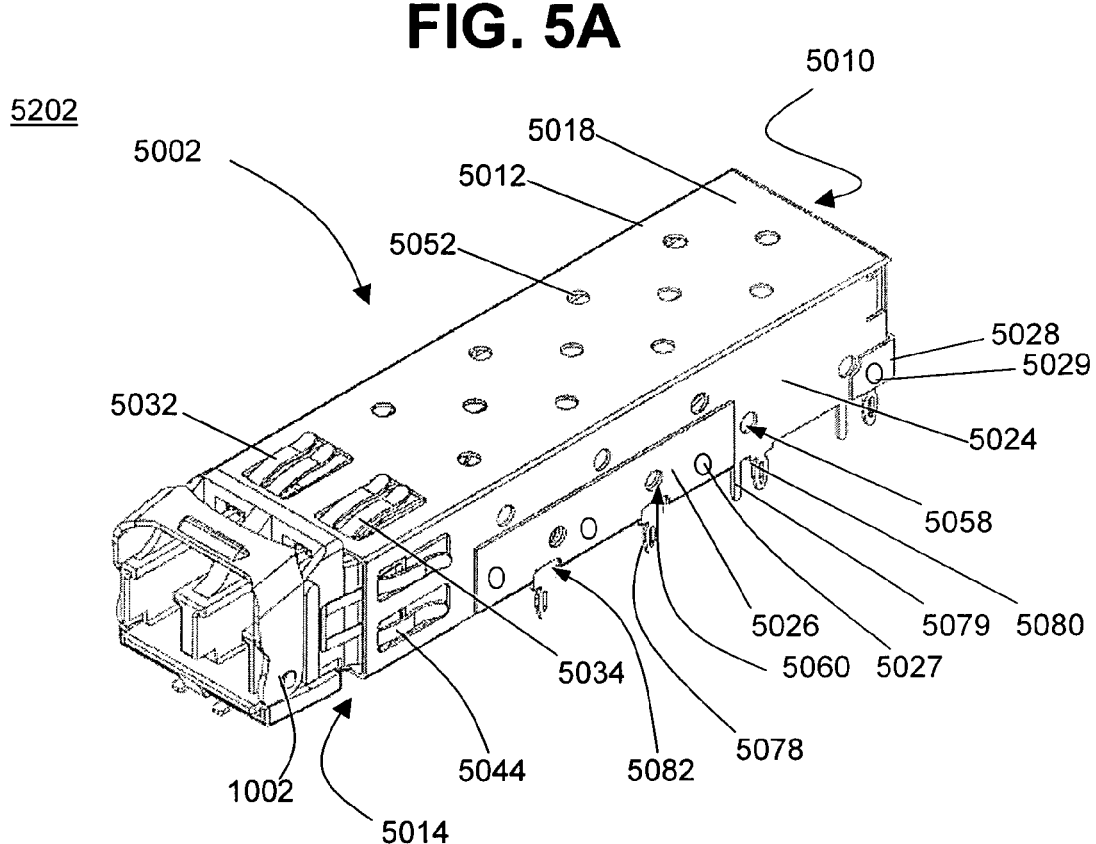
FIG. 5A is a top perspective view of a transceiver assembly constructed in accordance with a preferred embodiment of the invention.
Figure 5B:
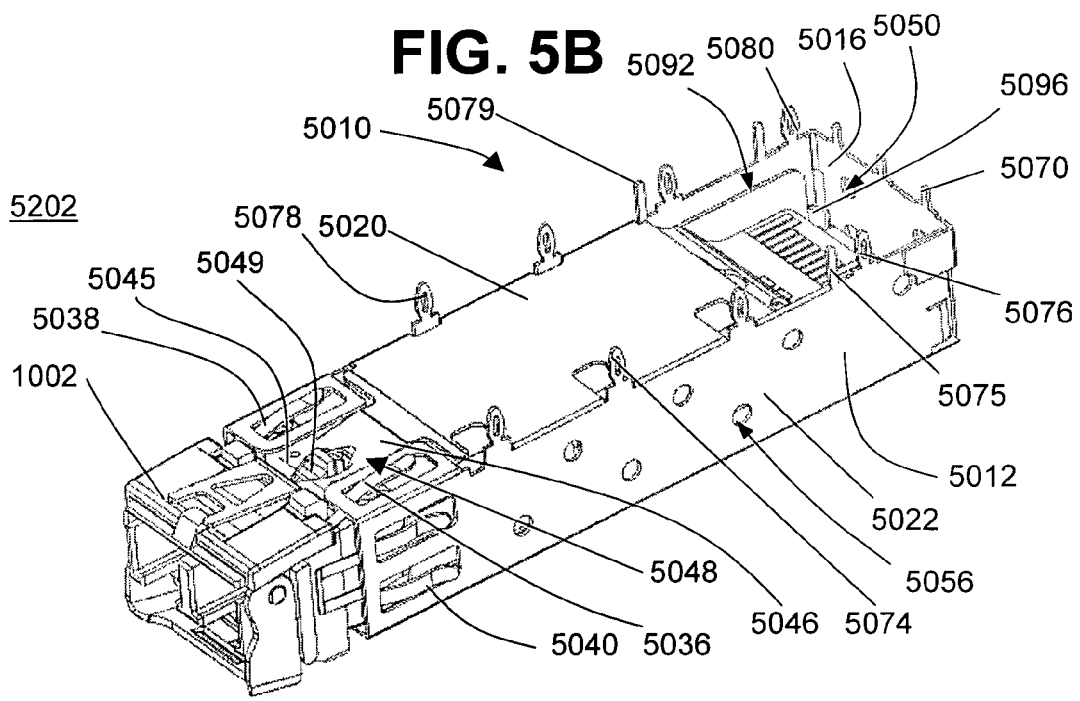
FIG. 5B is a bottom perspective view of the transceiver assembly of FIG. 5A.

FIGS. 5A and 5B illustrate a transceiver assembly 5002 of the present invention comprising transceiver module 1002 inserted into a transceiver cage 5010. Transceiver cage 5010 includes a body portion 5012 including a proximal open end 5014, a distal wall 5016, a top portion 5018, a bottom portion 5020, a left side 5022, a right side 5024, and a right side flap 5026. Right side flap 5026 is held to right side 5024 by welding at weld indentations 5027. A right back flap 5028 extends from distal wall 5016 and is bent to abut right side 5024. Right back flap 5026 is held to right side 5024 by welding at weld indentation 5029. Proximal open end 5014 includes two top left internal contact fingers 5032, two top right internal contact fingers 5034, one bottom left internal contact finger 5036, one bottom right internal contact finger 5038, two left internal contact fingers 5040, two right internal contact fingers 5044, and a catch 5045 at a distal end of a bottom spring 5046 having a triangular opening 5048 having a proximal edge 5049. Spring 5046 is biased upwardly.

Distal wall 5016 includes radiation control openings 5050, top portion 5018 includes radiation control openings 5052, left side 5022 includes radiation control openings 5056, right side 5024 includes radiation control openings 5058, and right side flap 5026 includes radiation control openings 5060. Extending from distal wall 5016 are distal straight mounting pins 5070, extending from left side 5022 are left proximal oval mounting pins 5074 left straight mounting pin 5075 and left distal oval mounting pin 5076, and extending from right side 5024 are right proximal oval mounting pins 5078, right straight mounting pins 5079, and right oval distal mounting pins 5080. Right proximal oval mounting pins 5078 extend through locking openings 5082 in bottom portion 5020, thereby causing right side flap 5026 to abut against and be in electrical contact with right side 5024. In use, transceiver cage 5010 is mounted on a printed wiring board (not shown). Transceiver cage 5010 also includes an opening 5092 (see FIG. 5B) and a right distal spring 5096 and a left distal spring (not shown) that are similar to right distal spring 4096 and left distal spring 4094, respectively of cage 4010 illustrated in FIG. 4E.

In FIGS. 5A and 5B, transceiver assembly 5002 is in a latched position 5202 in which transceiver module 1002 is in the latched position 1092 of FIGS. 1A and 1B. Rocker pin 1514 extends through triangular opening 5048 and is forced against proximal edge 5049 by the distal springs pushing against distal end wall 1108, thereby biasing transceiver frame 1010 and transceiver module 1002 in a proximal direction.

For the purposes of the present invention, transceiver cage 5010 functions similarly to transceiver cage 4010. Also, the various elements of cage 5010, unless specifically indicated otherwise, are either similar or identical in both shape and function to counterpart elements of cage 4010. For example, catch 5045, bottom spring 5046, triangular opening 5048, and proximal edge 5049 of cage 5010 are similar to catch 4045, spring 4046, triangular opening 5048 and proximal edge 5049 and the two distal springs (only one of which, distal spring 5096 are visible in FIGS. 5A and 5B) of cage 5010 are similar in shape and function to the distal springs 4094 and 4096 of cage 4010.

The transceiver cage of the present invention may be mounted onto the host printed wiring assembly (PWA) by soldering the mounting pins into the host PWA or by pressing the mounting pins into undersized openings that allow the mounting pins to be held in place by the force of friction. Mounting pins designed for soldering to the PWA are generally substantially straight, such as those illustrated in FIGS. 4A, 4B, and FIGS. 4E–J. Mounting pins designed for pressing to the PWA are generally shaped, such as the shaped mounting pins 5074, 5076, 5078 and 5080 illustrated in FIG. 5B.

Figure 6A:
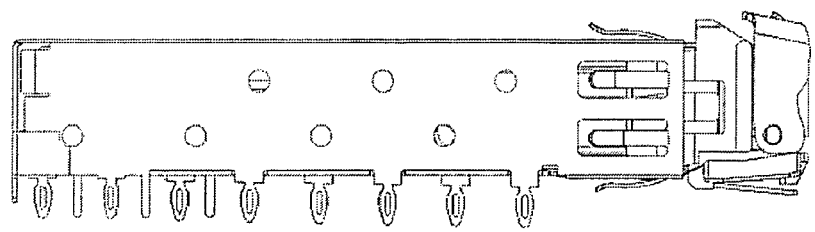
FIG. 6A is a side view of a transceiver assembly of the present invention in a latched position.
Figure 6B:
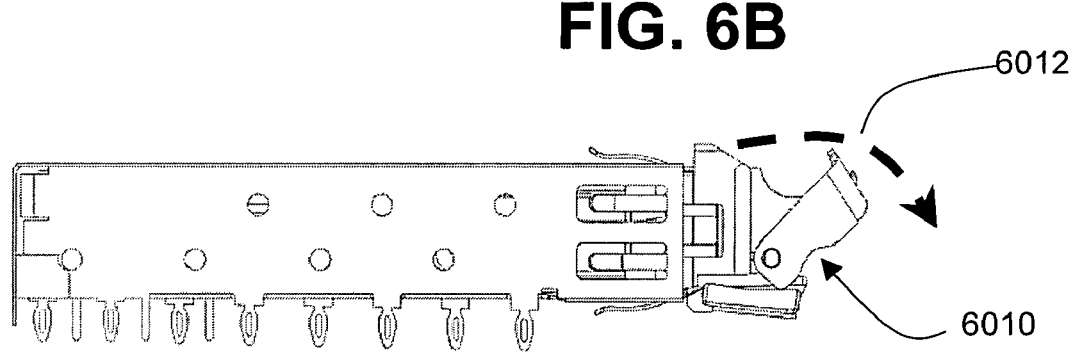
FIG. 6B is a side view of the transceiver assembly of FIG. 6A in a midstroke position.
Figure 6C:
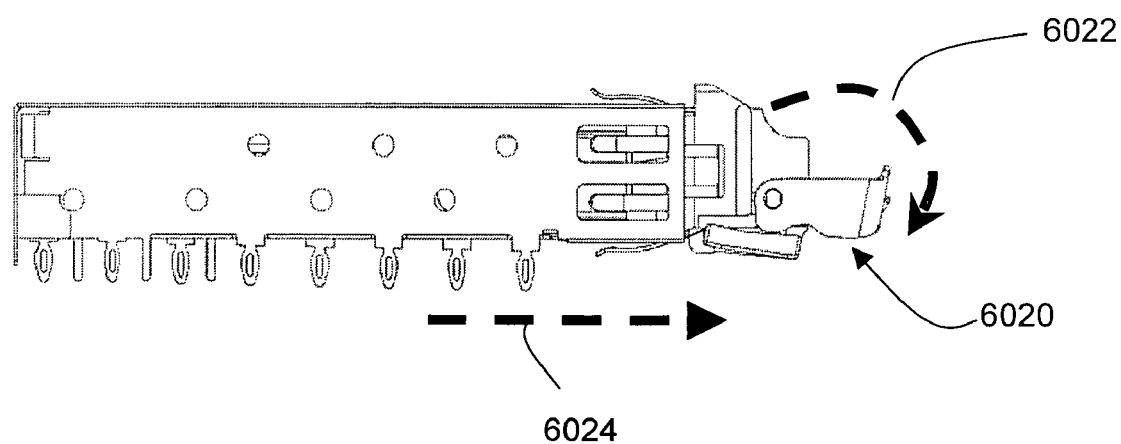
FIG. 6C is a side view of the transceiver assembly of FIG. 6A in an unlatched position.

FIGS. 6A, 6B, and 6C illustrate how transceiver assembly 5002 allows a transceiver module 1002 to be easily unlatched from and ejected from transceiver cage 5010. In FIG. 6A, transceiver assembly 5002 is in latched position 5202 as described above. In FIG. 6B, transceiver assembly 5002 is in a midstroke position 6010 in which transceiver module 1002 is in a midstroke position 2002 as described above in which handle 1060 has pivoted downwardly as indicated by dashed arrow 6012. Rocker pin 1514 has begun to withdraw through triangular opening 5048. In FIG. 6C, transceiver assembly 5002 is an unlatched position 6010 in which transceiver module 1002 is in an unlatched position as described above and transceiver handle 1060 has pivoted to a horizontal position indicated by arrow 6022. Rocker pin 1514 has been fully withdrawn through triangular opening 5048 and so that proximal rocker pin 1514 no longer abuts proximal edge 5049. Right distal spring 5096 and left distal spring of cage 5010 push against distal end wall 1108, thereby causing transceiver module 1002 to be ejected from transceiver cage 5010 in a proximal direction indicated by arrow 6024. An operator may pull on handle 1060 in order to facilitate removal of transceiver module 1002 from transceiver cage 5010.

FIGS. 7A, 7B, 7C, 7D, 7E, 7F, 7G, 7H, 7I and 7J illustrate a transceiver module 7002 of the present invention having a transceiver body 7004 composed a top portion 7006 and bottom portion 7008. Top portion 7006 includes an optical receptacle 7010 at a proximal end 7012 of transceiver body 7004. Top portion 7006 includes a lowered top side 7014 and opening 7016. Transceiver body 7004 has a right side 7018 and a left side 7020. A tongue 7022 is mounted on bottom portion 7008 so that an edge 7024 of tongue 7022 abuts an edge 7026 of bottom portion 7008. EMI collar 7028, including right bottom section 7030 and left bottom section 7032 is wrapped around a recessed upper neck section (not visible) of top portion 7006, a recessed lower neck section 7038 of bottom portion 7008, and tongue 7022 to assist in holding top portion 7006 and bottom portion 7008 together and hold tongue 7022 in place on bottom portion 7008. EMI collar 7028 has top external contact fingers 7042, four right side external contact fingers 7044, and four left side external contact fingers 7046. Extending from top portion 7006 is a distal end wall 7050. Transceiver body 7004 includes a distal opening 7052. Distal end 7054 of PWA 7056 does not extend distally as far as distal end wall 7050. Distal end 7054 includes contacts 7058.

The Transceiver module is designed to be mounted in a transceiver cage, such as transceiver cage 5010 described above. Preferably, the top portion and bottom portion of the transceiver module are made of cast metal such as zinc and may additionally be metalized, for example with nickel. Preferably the EMI collar and tongue are each made from a piece of sheet metal, preferably steel. Preferably the latch is made from a piece of bent wire 0.01 to 0.1 inches in diameter, with a typical value being about 0.03 inches.

The shape of external contact fingers 7042, 7044 and 7046 ensures a force fit wiping contact with the inner surface of transceiver cage 5010 and assists right distal spring 5096 and the left distal spring of cage 5010 with added ejection force when transceiver module 7002 is to be ejected from transceiver cage 5010. EMI collar 7042 includes an upper lozenge shaped ridge 7062 for vertical alignment. EMI collar 7042 additionally includes right alignment opening 7064 and left alignment opening 7066 which fit over right alignment tab 7068 and left alignment tab 7070 of top portion 7006. Tongue 7022 includes a right square opening 7072 and a left square opening 7074, a right wing 7076 and a left wing 7078, and a right slit 7080 and a left slit 7082.

The right bottom section and/or left bottom section of the EMI collar may be held by spring force to the tongue. The tongue may be mounted on the bottom portion of the transceiver module by adhesive or it may be held by the EMI collar.

Figure 7A:
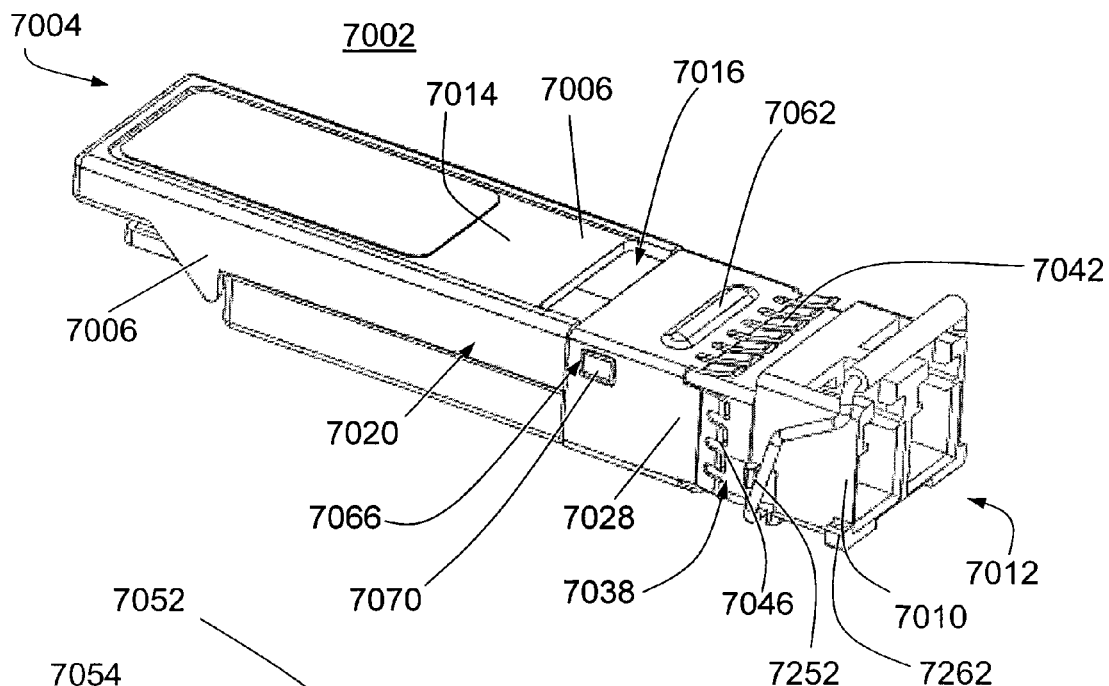
FIG. 7A is a top perspective view of an alternative embodiment of the transceiver module of the present invention.
Figure 7B:
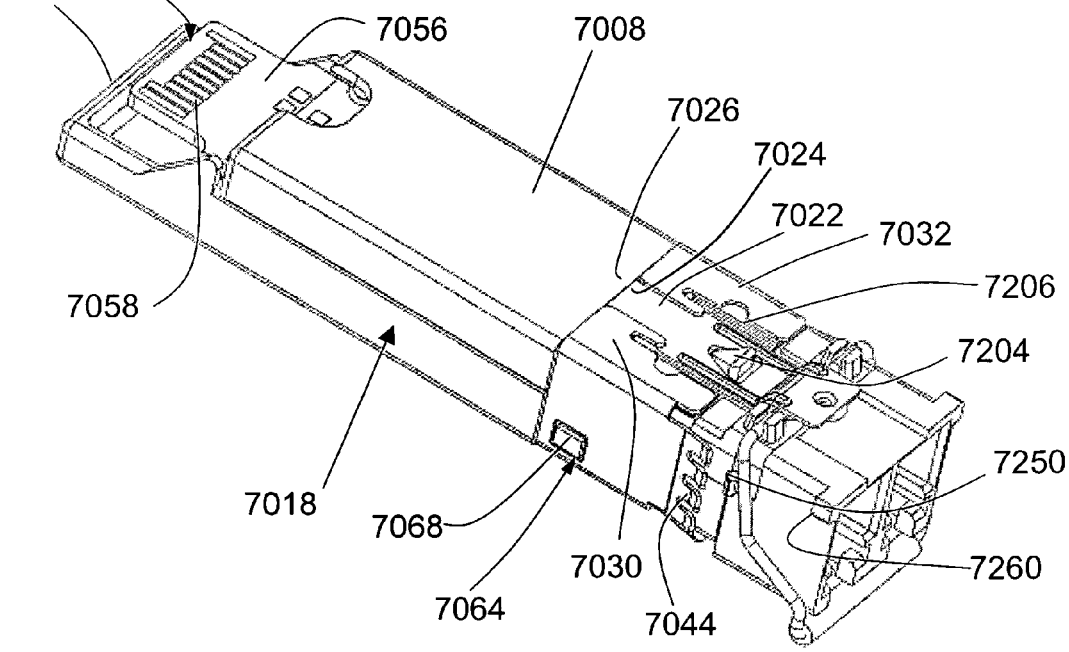
FIG. 7B is a bottom perspective view of the transceiver module of FIG. 7A.
Figure 7C:
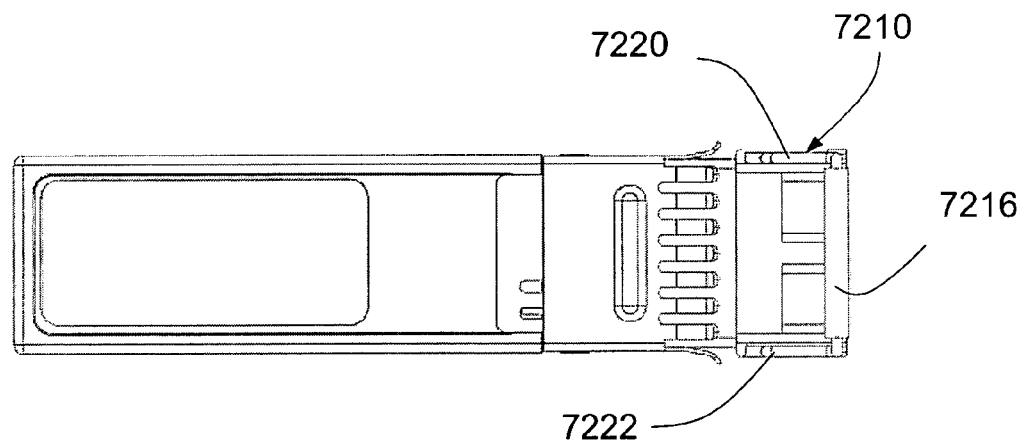
FIG. 7C is a top plan view of the transceiver module of FIG. 7A.
Figure 7D:
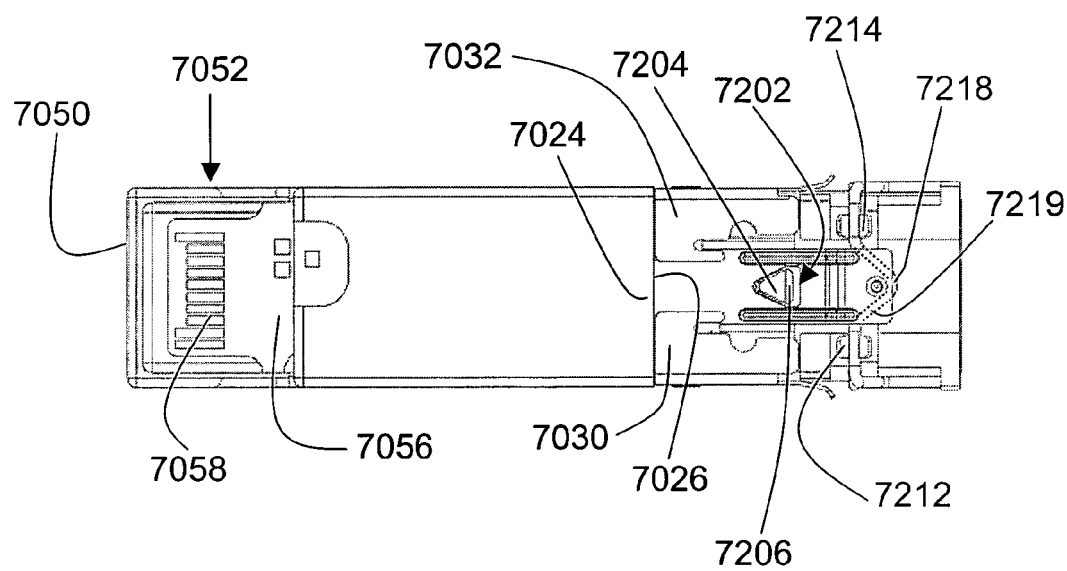
FIG. 7D is a bottom plan view of the transceiver module of FIG. 7A.
Figure 7E:
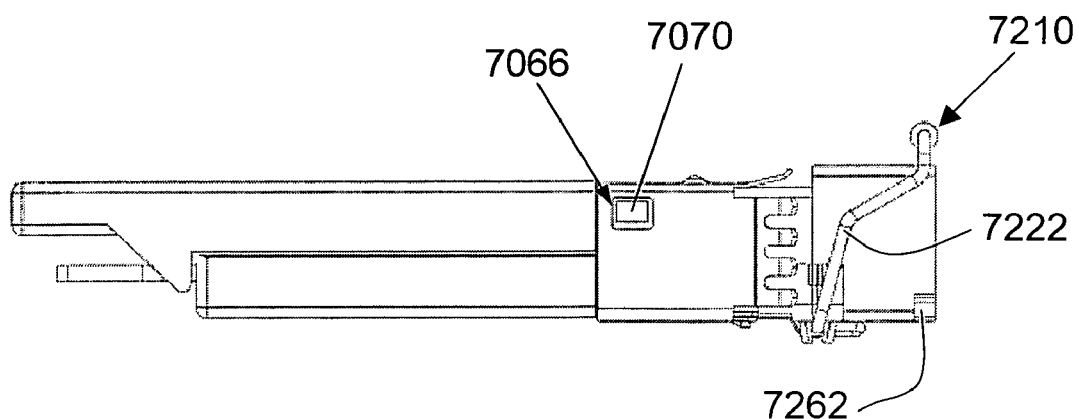
FIG. 7E is a side view of the transceiver module of FIG. 7A.
Figure 7F:
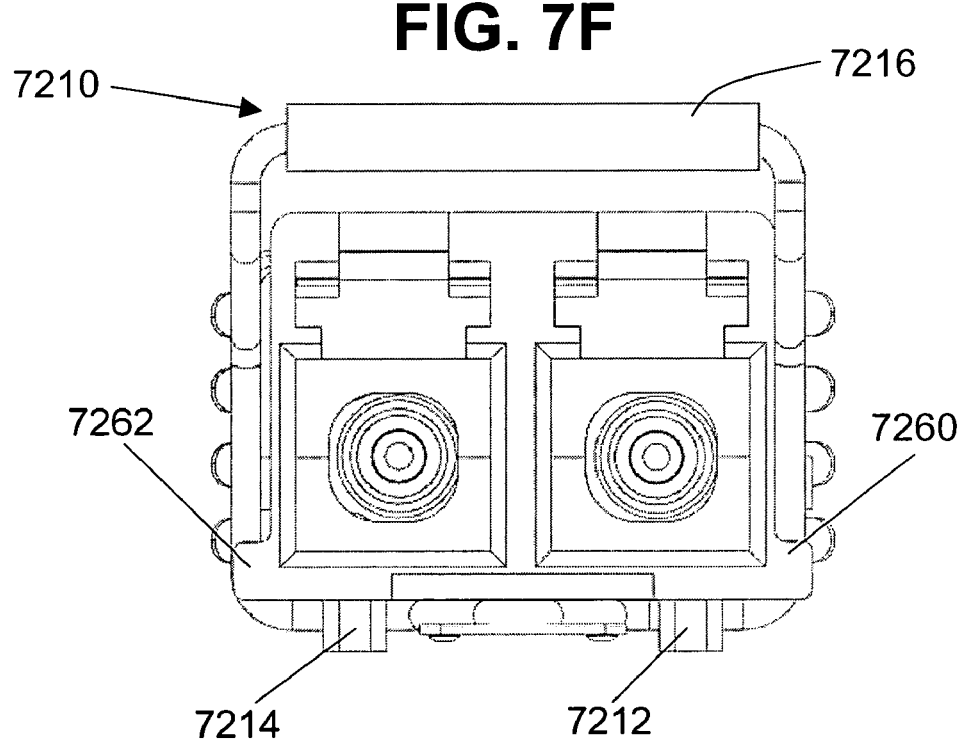
FIG. 7F is a front view of the transceiver module of FIG. 7A.
Figure 7G:
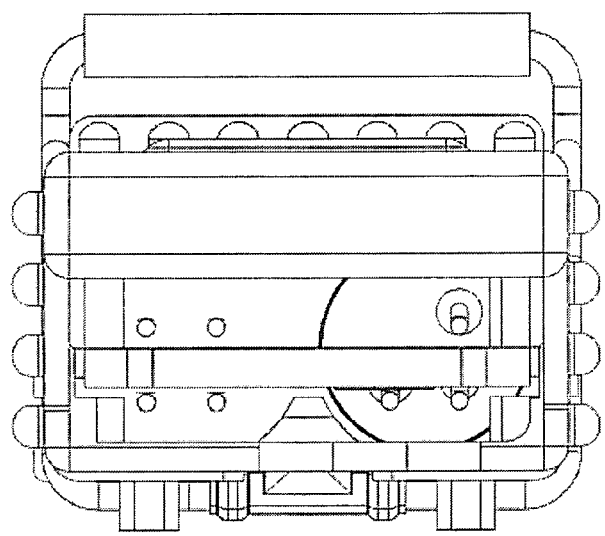
FIG. 7G is a back view of the transceiver module of FIG. 7A.
Figure 7H:
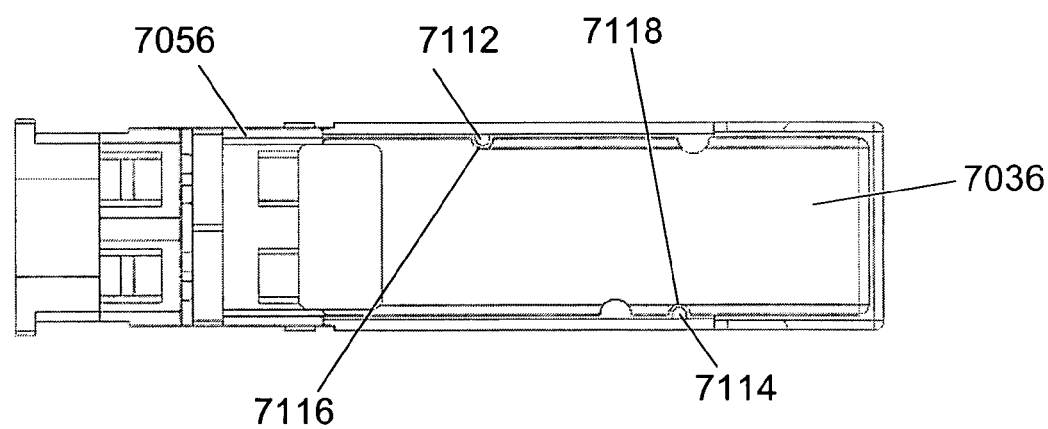
FIG. 7H is top plan view of the transceiver of FIG. 7A with the EMI collar of the transceiver removed to show interior detail.
Figure 7I:
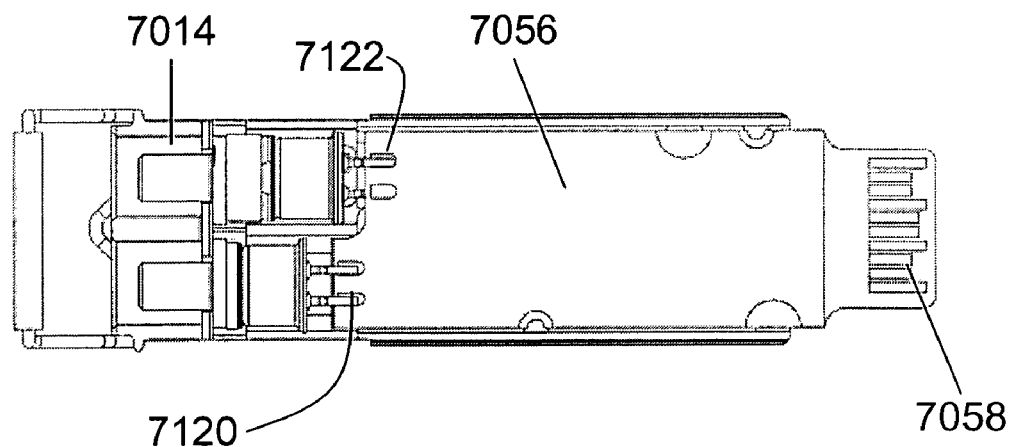
FIG. 7I is a top plan view of the transceiver of FIG. 7A with the EMI collar, the top portion of the transceiver, and part of the optical receptacle of the transceiver removed to show interior detail.
Figure 7J:
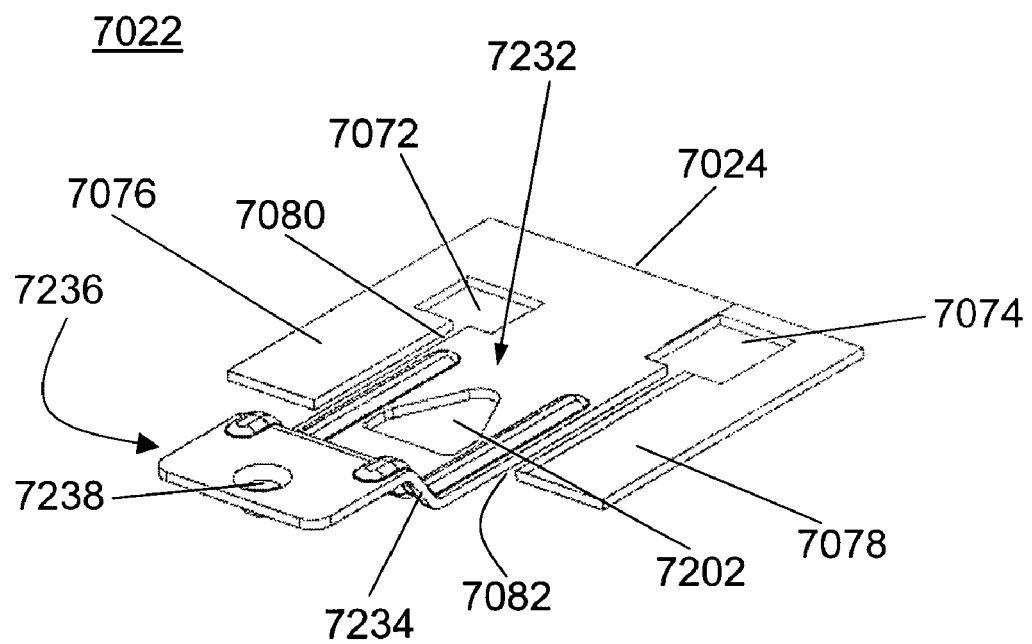
FIG. 7J is a perspective view a tongue of the transceiver module of FIG. 7B.

FIG. 7H illustrates transceiver module 7002 with EMI collar 7028 removed to show interior detail. Right ridge 7112 and left ridge 7114 of transceiver frame 7010 fit into right notch 7116 and left notches 7118, respectively of PWA 7056 to hold PWA 7056 in place. FIG. 7I illustrates transceiver module 7002 with EMI collar 7028, top portion 7006 and part of optical receptacle 7010 removed to illustrate how optical receptacle 7010 is electrically connected by right pins 7120 (only two of which is visible in FIG. 7I) and left pins 7122 (only one of which is visible in FIG. 7I). FIG. 7I illustrates how PWA 7056 appears before being mounted in transceiver module 7002.

Tongue 7022 includes a triangular opening 7202 that fits over a triangular pin 7204 of bottom portion 7008. Triangular pin 7204 has a raised abutment ridge 7206. A wire handle 7210 is pivotably mounted in two pivot mounts 7212 and 7214. Wire handle 7210 includes a covering 7216, a triangular cam 7218, right bent arm 7220 and left bent arm 7222. For clarity, covered portions 7219 of triangular cam 7218 are indicated by dashed lines in FIG. 7D. Tongue 7022 includes a spring 7232 having a bend 7234 and a proximal portion 7236 having a dimple 7238 for holding wire handle 7210 in place while in the latched position 8004 and for increasing the travel of tongue 7022 as wire handle 7210 is pivoted to an unlatched position, as shown in FIGS. 8B and 8C. In a latched position as illustrated in FIGS. 7A–I, proximal portion 7236 covers triangular cam 7218 and forces triangular cam 7218 flat against bottom portion 7008. Triangular cam 7218 being forced flat against bottom portion 7008 causes right bent arm 7220 and left bent arm 7222 to be biased to pivot towards the distal direction. However, the pivoting motion of handle 7210 is restricted in the distal direction by right bent arm 7220 and left bent arm 7222 abutting upper right arm stop 7250 and upper left arm stop 7252 of bottom portion 7008. The pivoting motion of handle 7210 is restricted in the downward direction by right bent arm 7220 and left bent arm 7222 abutting lower right arm stop 7260 and lower left arm stop 7262.

Figure 8A:
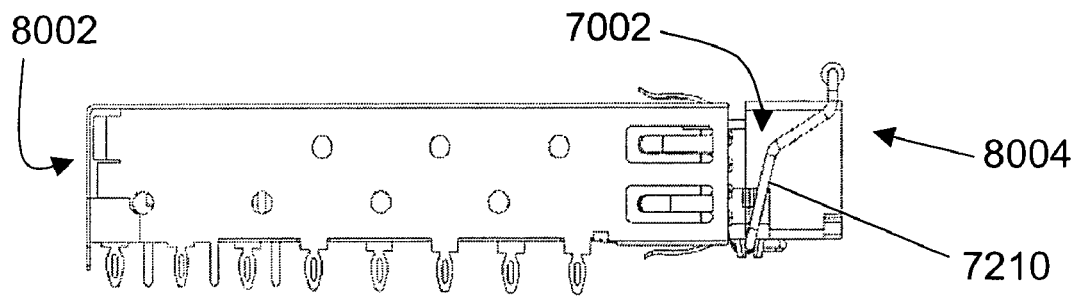
FIG. 8A is a side view of a transceiver assembly of the present invention in a latched position.
Figure 8B:
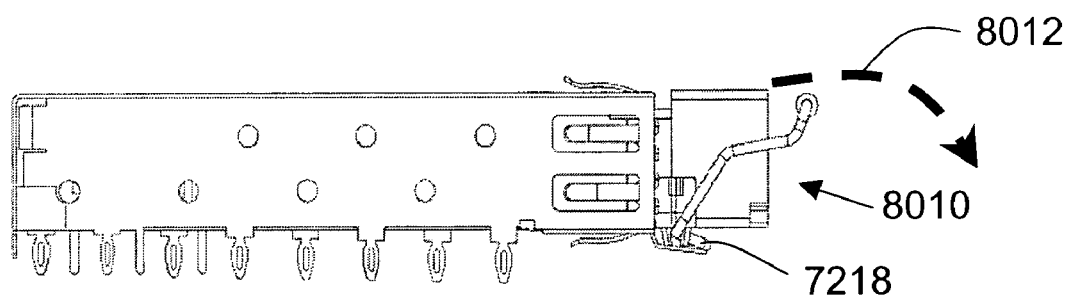
FIG. 8B is a side view of the transceiver assembly of FIG. 8A in a midstroke position.
Figure 8C:
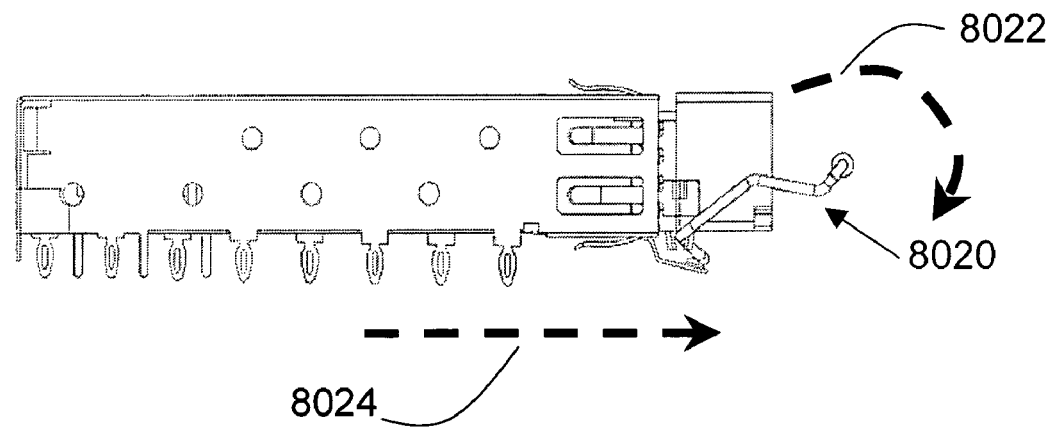
FIG. 8C is a side view of the transceiver assembly of FIG. 8A in an unlatched position.

FIGS. 8A, 8B, and 8C illustrate how a transceiver assembly 8002 allows a transceiver module 7002 to be easily unlatched from and ejected from transceiver cage 5010. In FIG. 8A, transceiver assembly 8002 is in latched position 8004 as described above. Right distal spring 5096 and the left distal spring of cage 5010 push against distal end wall 7050, thereby biasing transceiver frame 1010 and transceiver module 7002 in a proximal direction. Because triangular opening 5048 of bottom spring 5046 surrounds triangular pin 7204, the biasing of transceiver module 7002 in a proximal direction results in abutment ridge 7206 being forced into abutment with proximal edge 5049. In FIG. 8B, transceiver assembly 8002 is in a midstroke position 8010 in which transceiver module 7002 is in a midstroke position.

As wire handle 7210 is pivoted downwardly, as indicated by dashed arrow 8012, triangular cam 7218 lifts spring 7232 away from bottom portion 7008, thereby causing bottom spring 5046 to move downwardly and causing proximal edge 4049 to slide downwardly on triangular pin 7204 and raised abutment ridge 7206. In FIG. 8C, transceiver assembly 8002 is an unlatched position 8020 in which transceiver module 7002 is in an unlatched position due to wire handle 7210 being pivoted even further downwardly as indicated by dashed arrow 8022. Triangular cam has lifted spring 7232, and thereby, bottom spring 5046 sufficiently so that triangular opening 7202 no longer surrounds triangular pin 7204 and abutment ridge 7206 no longer abuts proximal edge 5049. Without the abutment of abutment ridge 7206 with proximal edge 5049, transceiver module 7002 is free to be ejected from transceiver cage 5010 in a proximal direction indicated by dashed arrow 8024.

FIG. 9 illustrates a multi-transceiver assembly structure 9000 that includes a PWA 9004 and a chassis panel 9006. Transceiver modules 9008, 9010, 9012, 9014, 9016 and 9018 of the present invention are connected PWA 9004 and mounted in cages 9020. Proximal ends 9022 of transceiver modules 9008, 9010, 9012, 9014, 9016 and 9018 extend through chassis panel 9006 connected to PWA 9004. In this embodiment, bottom sides 9024 and 9026 of transceiver modules 9008 and 9010, respectively, are on opposite sides of PWA 9004, because transceiver module 9008 is inverted with respect to transceiver module 9010.

Variations of the embodiment shown in FIG. 9 are possible, including one in which transceiver modules are mounted on top of each other in the same orientation. Additionally, a plurality of cages may be combined as a single cage in which a plurality of transceiver modules, for example 4 transceiver modules, are mounted.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

All documents, patents, journal articles and other materials cited in the present application are hereby incorporated by reference.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A transceiver module comprising:
    a transceiver body including a rocker return spring at a proximal end thereof;
    a handle pivotably connected to said proximal end of said transceiver body at first and second arms of said handle, said handle including first and second cams on said first and second arms, respectively, and said handle having an unlatched and a latched position; and
    a rocker pivotably mounted on said transceiver body, said rocker including a distal end having a tab for extending through an opening in said transceiver body and for extending through an opening in a transceiver cage to thereby hold said transceiver body in said transceiver cage when said handle is in a latched position, said rocker including a proximal free end that is biased against said first and second arms of said handle, wherein when said handle is an unlatched position, said first and second cams lift said proximal end of said rocker to cause said tab to retract from said transceiver cage opening thereby allowing said transceiver body to be removed from said transceiver cage in a proximal direction.

2. The transceiver module of claim 1, wherein said tab does not engage said opening of said transceiver body.

3. A transceiver assembly comprising:
    a transceiver cage;
    a transceiver body for inserted in said transceiver cage, said transceiver body including a rocker return spring at a proximal end thereof;
    a handle pivotably connected to said proximal end of said transceiver body at first and second arms of said handle, said handle including first and second cams on said first and second arms, respectively, and said handle having an unlatched and a latched position; and
    a rocker pivotably mounted on said transceiver body, said rocker including a distal end having a tab for extending through an opening in said transceiver body and for extending through an opening in said transceiver cage to thereby hold said transceiver body in said transceiver cage when said handle is in a latched position, said rocker including a proximal free end that is biased against said arm of handle, wherein when said handle is an unlatched position, said first and second cams lift said proximal end of said rocker to cause said tab to retract from said transceiver cage opening thereby allowing said transceiver body to be removed from said transceiver cage in a proximal direction.

4. The transceiver module of claim 3, wherein said tab does not engage said opening of said transceiver body.

5. The transceiver module of claim 3, wherein said spring means comprises springs mounted on each vertical side of said proximal end of said transceiver body.

6. The transceiver assembly of claim 3, wherein said transceiver cage includes spring means for urging said transceiver body out from said transceiver cage when said handle is in an unlatched position.

* * * * *